(12) United States Patent
Ahn et al.

(10) Patent No.: US 10,432,999 B2
(45) Date of Patent: Oct. 1, 2019

(54) DISPLAY DEVICE, DISPLAY SYSTEM AND METHOD FOR CONTROLLING DISPLAY DEVICE

(71) Applicant: SAMSUNG ELECTRONICS CO., LTD., Suwon-si (KR)

(72) Inventors: Young-chun Ahn, Suwon-si (KR); Myung-kwan Choi, Suwon-si (KR); Hyun-don Yoon, Pohang-si (KR); Hye-seon Heo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/701,598

(22) Filed: Sep. 12, 2017

(65) Prior Publication Data

US 2018/0302661 A1    Oct. 18, 2018

Related U.S. Application Data

(60) Provisional application No. 62/485,494, filed on Apr. 14, 2017.

(30) Foreign Application Priority Data

Jun. 9, 2017    (KR) .................. 10-2017-0072434

(51) Int. Cl.
*H04N 5/445*    (2011.01)
*H04N 21/422*    (2011.01)
(Continued)

(52) U.S. Cl.
CPC ....... *H04N 21/42204* (2013.01); *G06F 3/038* (2013.01); *G06F 3/0482* (2013.01);
(Continued)

(58) Field of Classification Search
CPC ................................... H04N 21/42204
(Continued)

(56) References Cited

U.S. PATENT DOCUMENTS 5,590,219 A * 12/1996 Gourdol .............. G06F 3/04883
    382/187
5,612,719 A *  3/1997 Beernink ............ G06F 3/04883
    345/172

(Continued)

FOREIGN PATENT DOCUMENTS

| JP | 2009205353 A | 9/2009 |
| KR | 1020080062845 A | 7/2008 |

(Continued)

OTHER PUBLICATIONS

Search Report dated Jun. 15, 2018, issued by the International Searching Authority in counterpart International Patent Application No. PCT/KR2018/002576 (PCT/ISA/210).

(Continued)

*Primary Examiner* — Michael B. Pierorazio
(74) *Attorney, Agent, or Firm* — Sughrue Mion, PLLC

(57) ABSTRACT

A display device is provided. The display device includes a display, a first communicator configured to communicate with an external device, a second communicator configured to communicate with a remote controller, and a processor configured to control the display to display an image corresponding to an image signal received from the external device through the first communicator, and the processor, in response to a control signal being received from the remote controller through the second communicator while the image is displayed on the display, controls the display to display a user interface (UI) for changing a channel, and in response to the control signal being received from the remote controller through the second communicator while an image which includes a specific object is displayed on the (Continued)

display, controls the display not to display the UI for changing a channel.

20 Claims, 22 Drawing Sheets

(51) Int. Cl.
*G06F 3/038* (2013.01)
*G06F 3/0482* (2013.01)
*G06F 3/0484* (2013.01)

(52) U.S. Cl.
CPC ... *G06F 3/04842* (2013.01); *H04N 21/42207* (2013.01); *H04N 21/42225* (2013.01); *H04N 21/42226* (2013.01)

(58) Field of Classification Search
USPC .......................................................... 725/38
See application file for complete search history.

(56) References Cited

U.S. PATENT DOCUMENTS

| | | | | |
|---|---|---|---|---|
| 6,421,067 B1* | 7/2002 | Kamen | ............... | G06F 3/04815 348/564 |
| 6,868,551 B1* | 3/2005 | Lawler | ............... | H04N 5/44543 348/E5.105 |
| 7,373,650 B1* | 5/2008 | Rodriguez | ......... | H04N 5/44591 348/565 |
| 7,610,555 B2* | 10/2009 | Klein | ................... | G06F 3/0481 341/176 |
| 7,853,973 B2* | 12/2010 | Chung | ................... | H04N 21/84 725/135 |
| 7,877,705 B2* | 1/2011 | Chambers | ............. | G06F 3/0485 345/173 |
| 8,302,127 B2* | 10/2012 | Klarfeld | ............... | G11B 27/105 705/14.66 |
| 2001/0052124 A1 | 12/2001 | Kim et al. | | |
| 2003/0117427 A1* | 6/2003 | Haughawout | ...... | G01C 21/3682 715/710 |
| 2004/0261038 A1* | 12/2004 | Ording | ................... | G06F 3/0481 715/792 |
| 2005/0060138 A1* | 3/2005 | Wang | ....................... | G06F 3/018 704/1 |
| 2005/0108751 A1* | 5/2005 | Dacosta | ................ | G06F 3/0482 725/39 |
| 2005/0204387 A1* | 9/2005 | Knudson | ............... | G06F 3/0482 725/52 |
| 2005/0235321 A1* | 10/2005 | Ahmad-Taylor | ............................ H04N 5/44543 725/56 |
| 2005/0251821 A1* | 11/2005 | Pina | ................... | H04N 21/4126 725/39 |
| 2007/0124792 A1* | 5/2007 | Bennett | ............... | H04M 1/0233 725/133 |
| 2007/0139386 A1* | 6/2007 | Martin | ................. | G06F 3/04886 345/173 |
| 2007/0165964 A1* | 7/2007 | Wolf | ....................... | G06F 9/451 382/276 |
| 2008/0165141 A1* | 7/2008 | Christie | .................. | G06F 3/044 345/173 |
| 2008/0225184 A1 | 9/2008 | Hardacker et al. | | |
| 2008/0271078 A1* | 10/2008 | Gossweiler | ........ | H04N 5/44543 725/40 |
| 2009/0144768 A1* | 6/2009 | Nagaraja | ............ | H04N 5/44543 725/39 |
| 2010/0238109 A1* | 9/2010 | Cook | ..................... | G06F 3/0346 345/156 |
| 2011/0037851 A1* | 2/2011 | Kim | ..................... | G06F 3/04847 348/143 |
| 2011/0085526 A1* | 4/2011 | Joseph | ............... | H04M 1/72533 370/338 |
| 2011/0202960 A1* | 8/2011 | Vaysman | ........... | H04N 5/44543 725/41 |
| 2011/0283189 A1* | 11/2011 | McCarty | ............ | H04N 5/44543 715/707 |
| 2011/0302610 A1* | 12/2011 | Karaoguz | .............. | G06Q 20/10 725/46 |
| 2011/0321094 A1* | 12/2011 | Kuo | ...................... | G06F 3/0481 725/40 |
| 2012/0131496 A1* | 5/2012 | Goossens | .............. | G06F 3/0481 715/784 |
| 2012/0151525 A1* | 6/2012 | Demchenko | ......... | H04N 21/482 725/39 |
| 2012/0224834 A1* | 9/2012 | Chen | ..................... | H04N 5/765 386/293 |
| 2012/0246679 A1* | 9/2012 | Chen | .................. | H04N 21/4788 725/38 |
| 2012/0278825 A1* | 11/2012 | Tran | ....................... | G06Q 30/04 725/13 |
| 2012/0284751 A1* | 11/2012 | Kim | ......................... | H04N 5/76 725/41 |
| 2012/0284753 A1* | 11/2012 | Roberts | ............ | H04N 21/41407 725/45 |
| 2012/0303476 A1* | 11/2012 | Krzyzanowski | .......... | G06F 8/60 705/26.5 |
| 2012/0306929 A1* | 12/2012 | Chalkov | ............... | G06F 3/0488 345/666 |
| 2012/0311444 A1* | 12/2012 | Chaudhri | ............ | G06F 3/04883 715/716 |
| 2012/0311634 A1* | 12/2012 | VanDuyn | ................. | H04N 5/76 725/41 |
| 2013/0033643 A1* | 2/2013 | Kim | ........................ | G06F 3/017 348/563 |
| 2013/0035941 A1* | 2/2013 | Kim | ........................ | G06F 3/017 704/275 |
| 2013/0035942 A1* | 2/2013 | Kim | ........................ | G06F 3/167 704/275 |
| 2013/0208135 A1* | 8/2013 | Han | ........................ | G06F 3/017 348/211.9 |
| 2014/0055675 A1 | 2/2014 | An et al. | | |
| 2014/0129979 A1* | 5/2014 | Bae | ........................ | G06F 3/0482 715/810 |
| 2014/0189601 A1 | 7/2014 | Kim et al. | | |
| 2015/0058893 A1 | 2/2015 | Hong et al. | | |
| 2015/0135218 A1* | 5/2015 | You | ..................... | H04N 21/4751 725/40 |
| 2016/0044272 A1* | 2/2016 | Radhakrishnan | .... | H04N 5/4403 348/731 |
| 2016/0066015 A1 | 3/2016 | Thissen et al. | | |
| 2016/0142662 A1* | 5/2016 | Lee | ....................... | G06F 3/0482 348/734 |
| 2016/0202872 A1 | 7/2016 | Jang et al. | | |
| 2016/0323626 A1 | 11/2016 | Kim et al. | | |
| 2017/0064215 A1* | 3/2017 | Cho | ........................ | H04N 5/268 |
| 2018/0192083 A1* | 7/2018 | Flores Guerra | ...... | H04N 21/235 |

FOREIGN PATENT DOCUMENTS

KR            101514438 B1     4/2015
KR    1020170025400 A     3/2017

OTHER PUBLICATIONS

Written Opinion dated Jun. 15, 2018, issued by the International Searching Authority in counterpart International Patent Application No. PCT/KR2018/002576 (PCT/ISA/237).
Communication dated Jul. 20, 2018, issued by the European Patent Office in counterpart European Patent Application No. 18159637.0.
Communication dated Mar. 27, 2019, issued by the European Patent Office in counterpart European Application No. 18 159 637.0.

* cited by examiner

|  |  | 1300 | | | |
|---|---|---|---|---|---|
| BROADCAST INFORMATION | | | | | |
| | THE OFFICE | | | | ~1311 |
| MON, JAN 21 | PM 02:00 | PM 02:30 | PM 03:00 | PM 03:30 | > |
| ∧ 100 | THE OFFICE | | WORLD NEWS TONIGHT | | |
| 101 | BIG COMEDY EPISODE 123 | | BIG COMEDY EPISODE 122 | | |
| 102 | FISHING VILLAGE STORY EPISODE 7 | | FISHING VILLAGE STORY EPISODE 8 | | |
| 103 | GREECE THAN FLOWER EPISODE 6 | | GREECE THAN FLOWER EPISODE 7 | | |
| 104 | M DOWN EPISODE 428 | | M DOWN EPISODE 417 | | |
| 105 | YOUR VOICE EPISODE 8 | | YOUR VOICE EPISODE 9 | | |
| ∨ 106 | YOU ARE BEAUTIFUL | | DOING WELL ON MY OWN | | |

300

DISPLAY DEVICE, DISPLAY SYSTEM AND METHOD FOR CONTROLLING DISPLAY DEVICE

CROSS-REFERENCE TO RELATED APPLICATIONS

This application claims priority from U.S. Provisional Patent Application No. 62/485,494, filed on Apr. 14, 2017, and Korean Patent Application No. 10-2017-0072434, filed on Jun. 9, 2017 in the Korean Intellectual Property Office, the disclosure of which is incorporated herein by reference in its entirety.

BACKGROUND

1. Field

Aspects of the exemplary embodiments relate to a display device, a display system and a method for controlling the display device, and more particularly, to a display device which provides a user interface (UI) for changing a channel, a display system and a method for controlling the display device.

2. Description of Related Art

As electronic devices continue to be developed, new ways of controlling an electronic device are also being developed. Conventionally, the electronic device is controlled using buttons installed in the electronic device or a remote control that is a separate device from the electronic device.

When the electronic device is controlled by using the separate remote controller, a user may be hindered by being required to press the buttons on the remote controller multiple times to perform a requested operation.

For example, an existing channel changing method is to change a channel by inputting a desired channel number by using number buttons on a remote controller, which is a one channel converting method, or to use channel up/down buttons, which is a successive channel converting method.

However, if there are many channels and a user changes a channel frequently, it is inconvenient for the user to move fingers to input number buttons. In addition, in this case, it is difficult to memorize channel numbers, and thus it is inconvenient for the user to change a channel among various scopes of the channels and to search a channel by changing the number one by one. In addition, if a user uses the channel up/down buttons, in the case in which there are many channels and the channel is changed frequently, especially the interval between the current channel and the desired channel is large, it takes long time to change a channel.

Accordingly, there is necessity for users to search and change a channel more easily.

SUMMARY

An aspect of the exemplary embodiment has been made to address the problems described above and to provide a display device which provides a UI for changing a channel, a display system and a method for controlling the display device.

According to an exemplary embodiment, there is provided a display device including a display, a first communicator configured to communicate with an external device, a second communicator configured to communicate with a remote controller, and a processor configured to control the display to display an image corresponding to an image signal received from the external device through the first communicator, and the processor, in response to a control signal being received from the remote controller through the second communicator while the image is displayed on the display, controls the display to display a user interface (UI) for changing a channel, and in response to the control signal being received from the remote controller through the second communicator while an image which includes a specific object is displayed on the display, controls the display not to display the UI for changing a channel.

The processor, in response to a UI which informs a channel change being displayed on the display, may activate a display function of the UI for changing a channel, and in response to the control signal being received while the display function of the UI for changing a channel is activated, may control the display to display the UI for changing a channel.

The processor, in response to the UI for changing a channel being displayed and the control signal not being received for a preset time, may deactivate the display function of the UI for changing a channel.

The processor, in response to the control signal not being received while the UI which informs the channel change is displayed on the display and the UI which informs the channel change disappearing, may deactivate the display function of the UI for changing a channel.

The UI for changing a channel may include an indicator which searches a channel while moving toward a direction corresponding to the control signal, and the processor may recognize a channel number included in a UI element which is displayed when the channel is changed, and move the indicator from a point corresponding to the recognized channel number.

The processor may control the display to display the recognized channel number in the indicator.

The UI for changing a channel may include an indicator which searches a channel while moving toward a direction corresponding to the control signal, and the processor, in response to the indicator moving and stopping, may perform an operation to control the external device to change a channel to a channel corresponding to a position in which the indicator stops.

The processor may transmit a control signal which corresponds to the channel corresponding to the position in which the indicator stops to the external device through the first communicator.

The processor may transmit a control command which corresponds to the channel corresponding to the position in which the indicator stops to the remote controller through the second communicator, and the control command may be a control command which causes the remote controller to transmit the control signal for controlling the external device to change a channel to the channel corresponding to the position in which the indicator stops.

The specific object may include at least one of a menu UI which includes a plurality of selectable UI elements and an electronic program guide (EPG).

According to an exemplary embodiment, there is provided a display system including an image providing apparatus configured to provide an image signal, a display device configured to display an image corresponding to an image signal provided from the image providing apparatus, and a remote controller configured to transmit a control signal, and the display device configured to display a UI for changing a channel in response to the control signal being received from the remote controller while the image is displayed on the display device, and control not to display the UI for changing a channel in response to the control signal being received from the remote controller while an image including a specific object is displayed on the display device.

The remote controller, in response to a preset time being passed in a state in which a specific button of the remote controller is selected, may transmit the control signal.

The display device may display an indicator which searches a channel while moving toward a direction corresponding to the control signal on the UI for changing a channel, and transmit a control signal which corresponds to a channel corresponding to a position in which the indicator stops to the image providing apparatus.

The display device may display an indicator which searches a channel while moving toward a direction corresponding to the control signal on the UI for changing a channel, and transmits a control command which corresponds to the channel corresponding to the position in which the indicator stops to the remote controller, and the remote controller may receive the control command from the display device, transmits a control signal which corresponds to the channel corresponding to the position in which the indicator stops to the image providing apparatus.

According to an exemplary embodiment, there is provided a method for controlling a display device including displaying an image corresponding to an image signal provided from an external device, in response to a control signal being received from a remote controller while the image is displayed on the display device, displaying a UI for changing a channel on the display device, and in response to the control signal being received from the remote controller while an image including a specific object is displayed on the display device, controlling not to display the UI for changing a channel on the display device.

The displaying the UI for changing a channel may include, in response to a UI informing a channel change being displayed on the display device, activating a display function of the UI for changing a channel, and in response to the control signal being received while the display function of the UI for changing a channel is activated, controlling to display the UI for changing a channel.

The controlling method may further include, in response to the UI for changing a channel being displayed and the control signal not being received during a preset time, deactivating the display function of the UI for changing a channel.

The controlling method may further include, in response to the control signal not being received while the UI informing the channel change is displayed on the display device and the UI informing the channel change disappearing, deactivating the display function of the UI for changing a channel.

The UI for changing a channel may include an indicator which searches a channel while moving toward a direction corresponding to the control signal, and the displaying the UI for changing a channel may recognize a channel number included in a UI element which is displayed when the channel is changed, and moves the indicator from a position corresponding to the recognized channel number.

The displaying the UI for changing a channel may display the recognized channel number in the indicator.

According to an exemplary embodiment, there is provided a display device including a display, a communicator configured to communicate with an external device and a remote controller, and a processor configured to control the display to display an image corresponding to an image signal received from the external device through the communicator, and the processor, in response to a control signal being received from the remote controller through the communicator while the image is displayed on the display, controls the display to display a user interface (UI) for changing a channel, and in response to the control signal being received from the remote controller through the communicator while an image which includes a specific object is displayed on the display, controls the display not to display the UI for changing a channel.

The processor may, in response to a UI which informs a channel change being displayed on the display, activate a display function of the UI for changing a channel, and in response to the control signal being received while the display function of the UI for changing a channel is activated, control the display to display the UI for changing a channel.

The UI for changing a channel may include an indicator which searches a channel while moving toward a direction corresponding to the control signal, and the processor may, in response to the indicator moving and stopping, perform an operation to control the external device to change a channel to a channel corresponding to a position in which the indicator stops.

BRIEF DESCRIPTION OF THE DRAWINGS

FIGS. 10 to 13 are views to illustrate a UI providing method for changing a channel according to various exemplary embodiments;

DETAILED DESCRIPTION OF EXEMPLARY EMBODIMENTS

Figure 1:
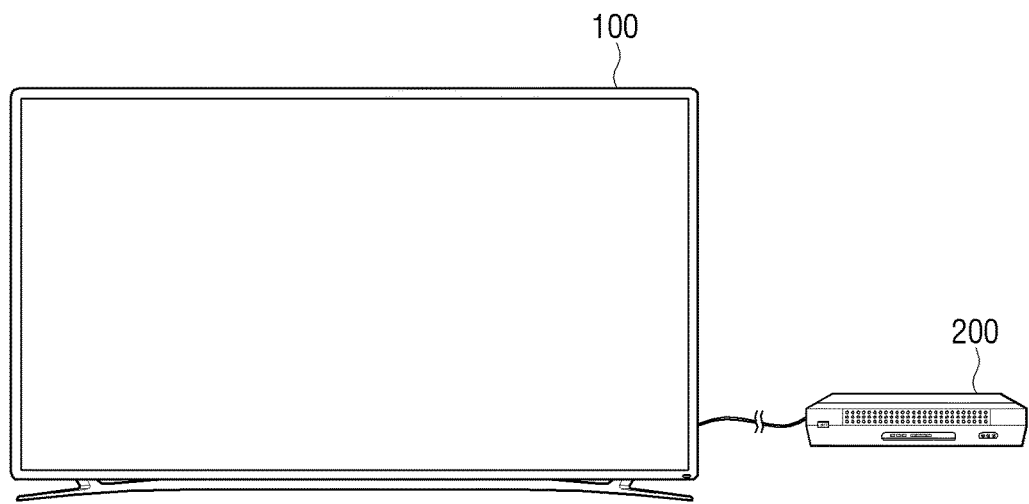
FIG. 1 is a view to illustrate a display system according to an exemplary embodiment.
Figure 1:
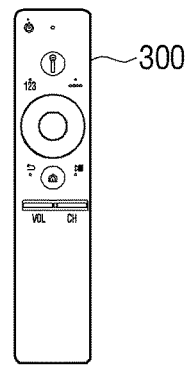

Before specifically describing the exemplary embodiment, a method for demonstrating the exemplary embodiment and drawings will be described.

With respect to the terms used in an exemplary embodiment, general terms currently widely used are selected in view of function with respect to various exemplary embodiments. However, these terms may vary depending on intention, legal or technical interpretation, emergence of new technologies, and the like of those skilled in the related art. Further, some of the terms may be ones arbitrarily selected by the applicant. Unless there is a specific definition of a term, the term may be construed based on the overall contents and technological common sense of those skilled in the related art.

Further, the same reference numerals or symbols used in the drawings accompanied with the disclosure refer to components or elements that perform substantially the same functions. For convenience of explanation and understanding, the same reference numerals or symbols are used in describing different embodiments. That is, the same reference numerals in a plurality of drawings do not necessarily mean that the drawings are directed to one same embodiment.

Further, terms including ordinal number such as "first," "second," and so on may be used in the description and the claims in order to distinguish among elements. The ordinal numbers are used in order to distinguish the same or similar elements from one another, and the use of the ordinal number should not be understood as limiting the meaning of the terms. For example, an element combined with an ordinal number is not limited because of the ordinal number in the order the element is being used, in the order the element is being disposed, and so on. When necessary, the numerical expressions may be exchanged between components.

The singular expression also includes the plural meaning as long as it does not differently mean in the context. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not illustrated).

Further, in embodiments of the present disclosure, when it is described that a portion is connected to another portion, the portion may be either connected directly to the other portion, or connected indirectly via another medium. Further, when a certain portion includes a certain element, unless specified to the contrary, this means that another element may be additionally included, rather than precluding another element.

Hereinafter, the present disclosure will be described in detail with reference to the attached drawings.

FIG. 1 is a view illustrating a display device 100, an image providing apparatus 200 and a remote controller 300 according to an exemplary embodiment.

The display device 100 may be a TV as shown in FIG. 1, but this is merely an exemplary embodiment. The display device 100 may be implemented as various types of devices such as a smartphone, a tablet personal computer (PC), a desktop PC, a projector, and the like.

The image providing apparatus 200 may provide the display device 100 with an image signal. For example, the image providing apparatus 200 may provide the image signal via a High Definition Multimedia Interface (HDMI) to the display device 100, but it is not limited thereto. The image providing apparatus 200 may provide the image signal to the display device 100 via various types of wired or wireless communication methods.

The image providing apparatus 200 may be various types of devices such as a set top box, a PC, an over the top (OTT) and the like.

The remote controller 300 may be implemented as various types of devices capable of transmitting a control signal for controlling other apparatuses. For example, the remote controller 300 may be a remote control, a smart phone, a personal digital assistant (PDA), a mouse and the like.

The remote controller 300 may be equipped with a physical key, a soft key and the like, and receive a user operation. In another example, the remote controller 300 may be equipped with a motion sensor and receive a three dimensional movement of the remote controller 300 as the user operation.

The remote controller 300 may transmit the control signal corresponding to the input user operation. The remote controller 300 may use a wireless communication method such as infrared (IR), radio frequency (RF), Bluetooth, Wireless Fidelity (Wi-Fi) and the like. Alternatively, the remote controller 300 may be connected to an external device in a wired manner and transmit the control signal.

The remote controller 300 may operate with a Multi-Brand Remote (MBR) controller which controls many devices. For example, the remote controller 300 may control the display device 100 and the image providing apparatus 200 by using a control code set for controlling the display device 100 and a control code set for controlling the image providing apparatus 200. Here, the control code includes information regarding various control signals for controlling a specific device.

Even if the control code set for controlling the image providing apparatus 200 is not in the remote controller 300, if the control code set is stored in the display device 100, it is possible for the remote controller 300 to control the display device 100 so the display device 100 transmits the control signal to the image providing apparatus 200, or, the display device 100 may transmit a control command which causes the remote controller 300 to generate a specific control signal for controlling the image providing apparatus 200 to the remote controller 300.

The various embodiments above will be described in more detail referring to FIGS. 2 to 5.

Figure 2:
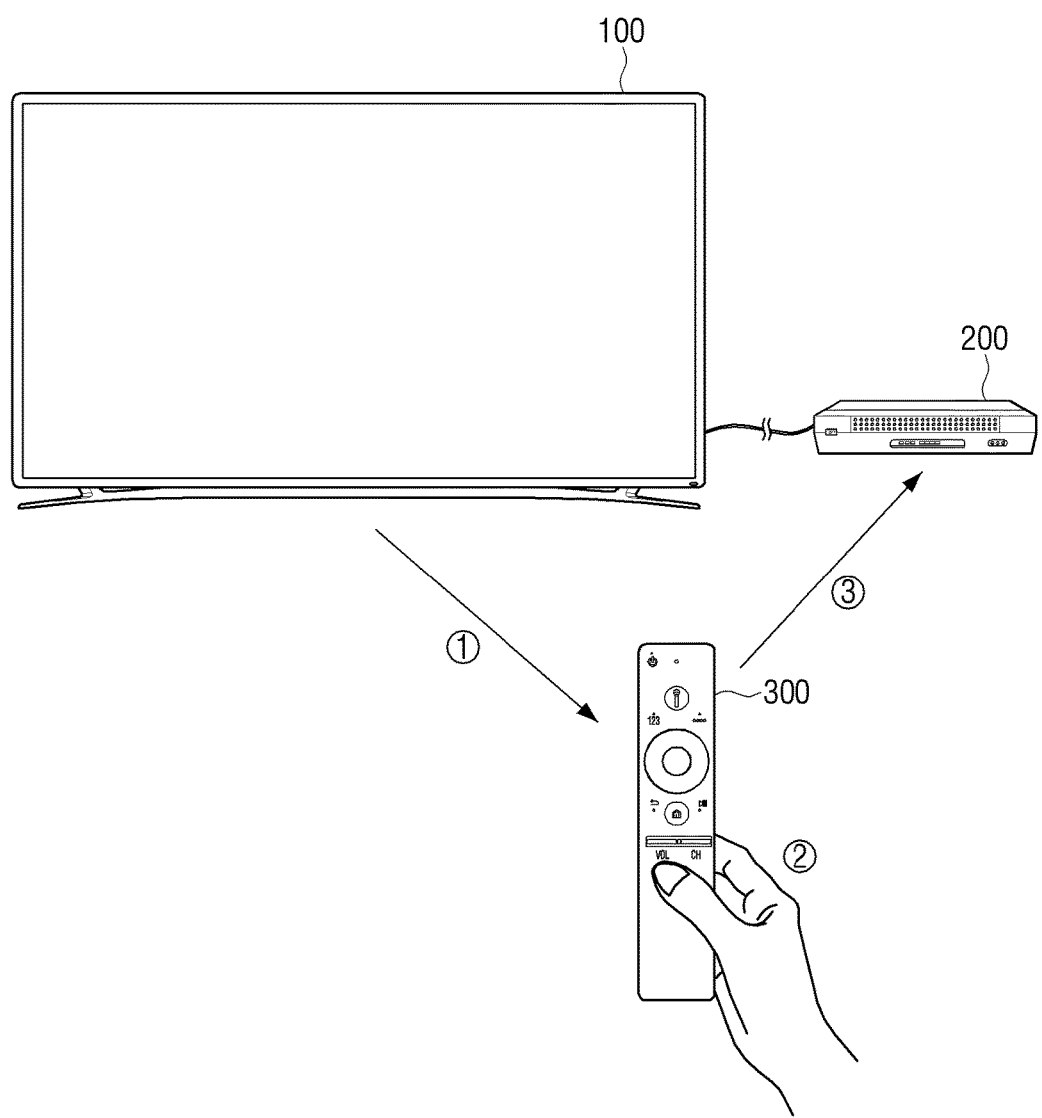
FIGS. 2 to 5 are views to illustrate a control operation in a display system according to various exemplary embodiments.

FIG. 2 is a view to illustrate a method in which the remote controller 300 directly controls the image providing apparatus 200 according to an exemplary embodiment.

Referring to FIG. 2, the display device 100 transmits the control code set for controlling the image providing apparatus 200 to the remote controller 300 (①). In this case, the control code set may be transmitted via a communication method such as Bluetooth, Wi-Fi, and the like. If there is a user operation in the remote controller 300 (②), the remote controller 300 transmits a control signal corresponding to the user operation by using the control code set provided from the display device 100 (③). In this case, the control signal may be transmitted via a wireless communication method such as infrared, Bluetooth, Wi-Fi and the like. Then, the image providing apparatus 200 performs an operation corresponding to the control signal transmitted from the remote controller 300.

In the above exemplary embodiment, it has been explained that the remote controller 300 receives the control code set for controlling the image providing apparatus 200 from the display device 100, but the remote controller 300 may download the control code set from external sources. Alternatively, it is also possible that a plurality of control code sets for controlling other various devices including the control code set for controlling the image providing apparatus 200 are stored in advance in the remote controller 300 and thereafter, the remote controller 300 obtains device information or entrepreneur information of the image providing apparatus 200 and selects the control code set for controlling the image providing apparatus 200 among the plurality of control code sets.

Meanwhile, the control code sets are different from each other according to an entrepreneur of a device, and thus in order to obtain the control code set of the image providing apparatus 200, it is required to identify the entrepreneur of the image providing apparatus 200. In other words, it is required to identify, for example, which company made the image providing apparatus 200. In order to identify the entrepreneur of the image providing apparatus 200, various methods can be used.

For example, a user may directly input information related to the entrepreneur of the image providing apparatus 200 to the remote controller 300, and the remote controller 300 may obtain the control code set for controlling the image providing apparatus 200 on the basis of the input information from, for example, the display device 100. Alternatively, a user may directly input the information related to the entrepreneur of the image providing apparatus 200 to the display device 100, and the display device 100 may transmit the control code set corresponding to the entrepreneur of the image providing apparatus 200 to the remote controller 300. Alternatively, the display device 100 may transmit the information related to the entrepreneur of the image providing apparatus 200 to the remote controller 300, and the remote controller 300 may download the control code set of the image providing apparatus 200 from an internet source.

In addition to the method in which a user directly inputs the entrepreneur information of the image providing apparatus 200 as described in the above, according to other exemplary embodiments, the display device 100 may obtain the entrepreneur information of the image providing apparatus 200 automatically. For example, the display device 100 may obtain the intrinsic characteristic, from which the entrepreneur of the image providing apparatus 200 can be derived, from an image signal provided by the image providing apparatus 200, and acquire the entrepreneur information of the image providing apparatus 200.

For example, the display device 100 may obtain the entrepreneur information of the image providing apparatus 200 by obtaining a logo, a name of the entrepreneur and the like from the image signal provided by the image providing apparatus 200. For example, referring to FIGS. 3A to 3B, an entrepreneur logo 311 may be obtained from a predetermined area of an image 310 which is provided by the image providing apparatus 200 and displayed on the display device 100, and an entrepreneur logo 321 of the image providing apparatus 200 may be obtained from a banner displayed on an image 320. The display device 100 may obtain entrepreneur information or device information of the image providing apparatus 200 based on the obtained entrepreneur logos 311 and 321. Meanwhile, it has been described that the display device 100 obtains the logo, the entrepreneur name and the like from the predetermined area, but it is not limited thereto. It is also possible to identify whether there is a recognition object in the entire area of the image. In this case, an artificial intelligence (AI) technology may be applied, and based on AI, the display device 100 may identify itself part of the image where the recognition object such as a broadcast logo, the entrepreneur name and the like exists, and recognize the corresponding information.

For another example, if the image providing apparatus 200 is connected to the display device 100 through a HDMI, the display device 100 may identify Consumer Electronics Control (CEC) information so as to obtain the entrepreneur information of the image providing apparatus 200. The CEC function enables the devices connected to one another through the HDMI to control one another, and if the devices support the CEC function, the CEC information may include the entrepreneur information of the image providing apparatus 200.

Meanwhile, in FIG. 2, it has been illustrated that the remote controller 300 obtains the control code set for controlling the image provide apparatus 200 and directly controls the image providing apparatus 200, but according to another embodiment, the remote controller 300 may control the image providing apparatus 200 indirectly through the display device 100. This operation will be described below with reference to FIG. 4.

Figure 4:
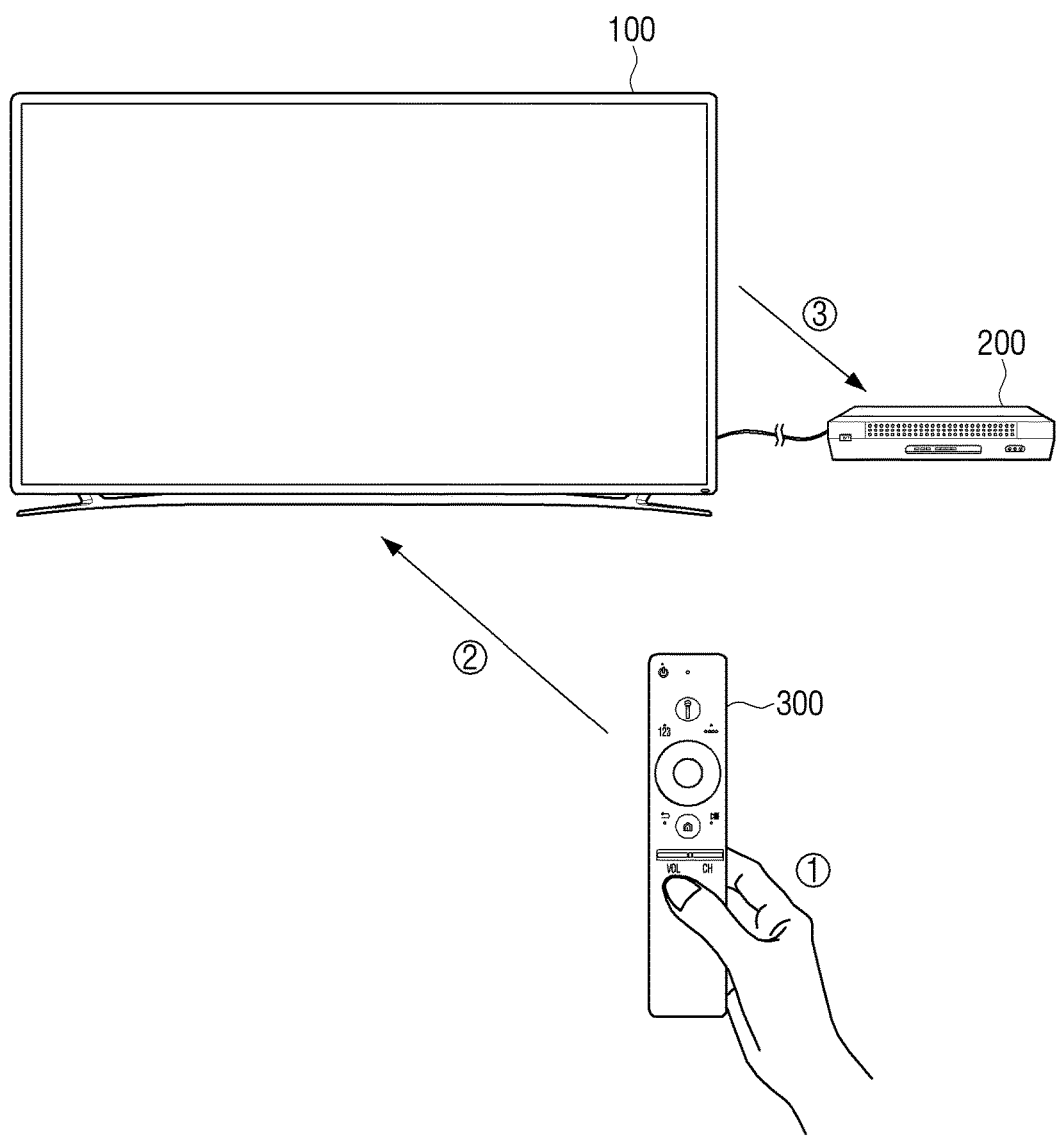

Referring to FIG. 4, if a user operation occurs in the remote controller 300 (①), the remote controller 300 transmits a control signal (a first control signal) corresponding to the user operation a via wireless communication method such as infrared, Bluetooth, Wi-Fi and the like (②). In this case, since the transmitted control signal is generated based on the control code set for controlling the display device 100, the image providing apparatus 200 does not react to the control signal. The display device 100 stores the control code set for controlling the image providing apparatus 200, and the display device 100 transmits a control signal (a second control signal) for controlling the image providing apparatus 200, the control signal which corresponds to the first control signal, based on the control code set for controlling the image providing apparatus 200 (③). For example, the display device 100 may transmit the second control signal via a wireless communication method such as infrared, Bluetooth, Wi-Fi and the like, or via a wired communication method such as the HDMI. The image providing apparatus 200 receives the second control signal and performs an operation corresponding to the second control signal.

According to the above exemplary embodiment described with reference to FIG. 4, even if the control code set for controlling the image providing apparatus 200 is not included in the remote controller 300, the remote controller 300 may indirectly control the image providing apparatus 200 through the display device 100.

Figure 5:
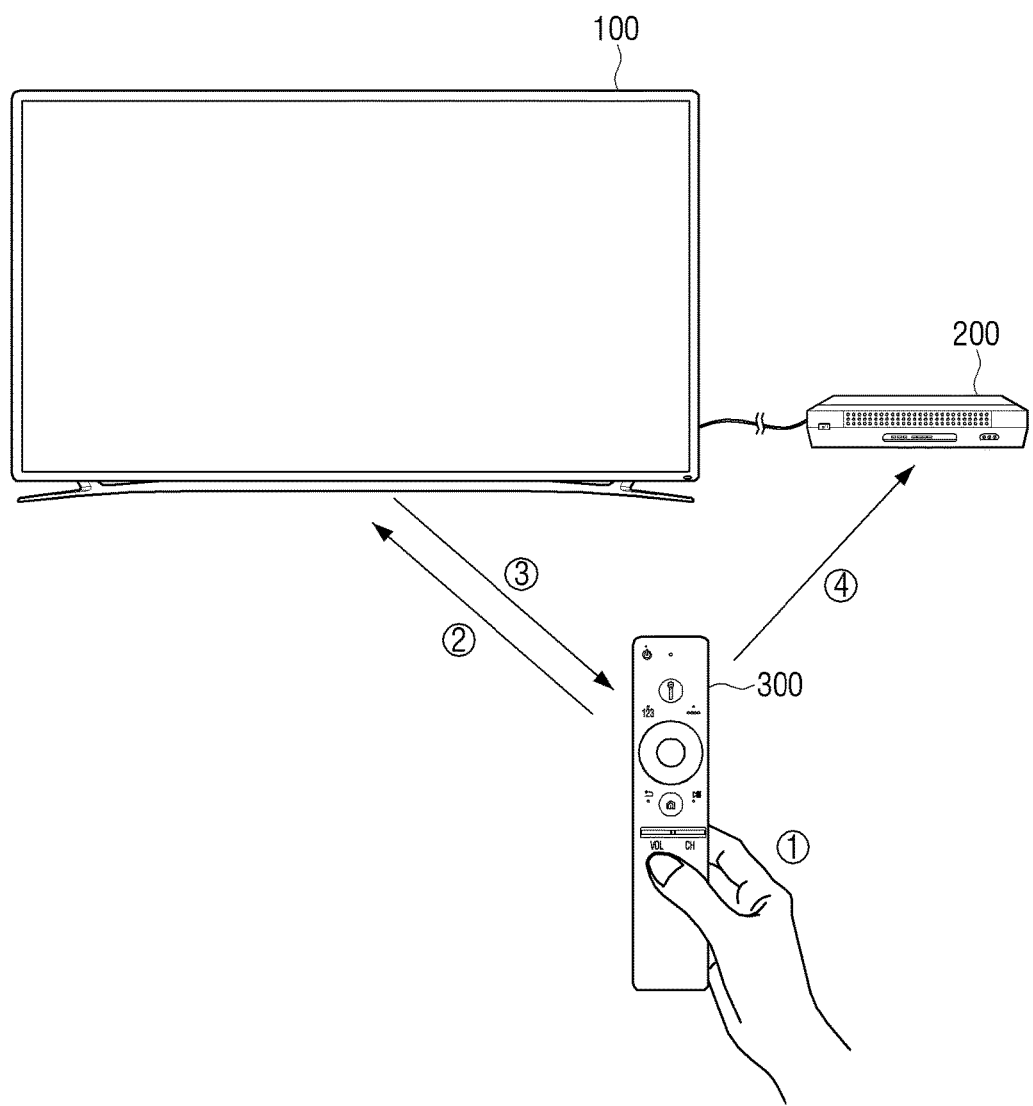

FIG. 5 is a view to illustrate a method in which the remote controller 300 controls the image providing apparatus 200 in a different way from the way of the embodiments described in FIGS. 2 and 4.

Referring to FIG. 5, if a user operation occurs in the remote controller 300 (①), the remote controller 300 transmits a control signal (a first control signal) corresponding to the user operation via a wireless communication method such as infrared, Bluetooth, Wi-Fi and the like (②). In this case, since the transmitted control signal is generated based on the control code set for controlling the display device 100, the image providing apparatus 200 does not react to the control signal. The display device 100 stores the control code set for controlling the image providing apparatus 200, and transmits the control command for controlling the remote controller 300 to transmit a control signal (a second control signal) for controlling the image providing apparatus 200, the control signal which corresponds to the first control signal, on the basis of the stored control code set (③). For example, the display device 100 may transmit the control command a via wireless communication method such as Bluetooth, Wi-Fi and the like. When the control command is received from the display device 100, the remote controller 300 transmits the second control signal (④). The image providing apparatus 200 receives the second control signal and performs an operation corresponding to the second control signal.

Figure 6:
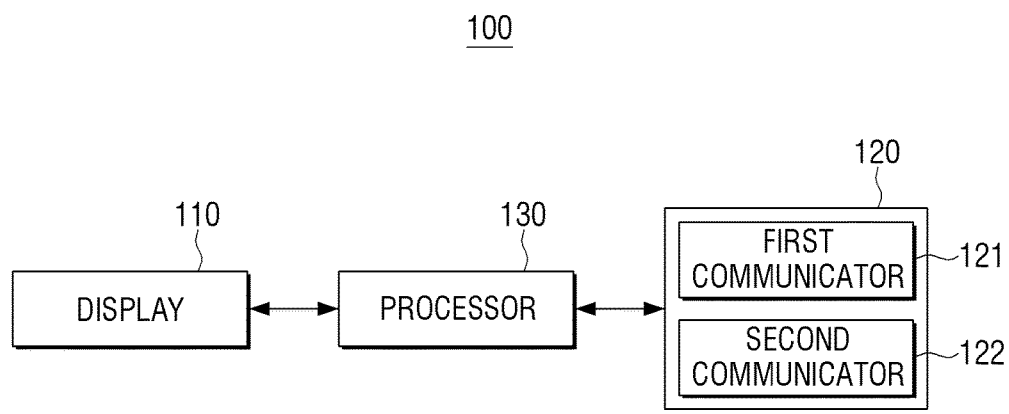
FIG. 6 is a block diagram to illustrate a display device according to an exemplary embodiment.

FIG. 6 is a view to illustrate the display device 100 according to an exemplary embodiment.

Referring to FIG. 6, the display device 100 includes a display 110, a communicator 120 and a processor 130.

The display 110 displays an image. The display 110 may be implemented as a Liquid Crystal Display (LCD), for example, and according to circumstances, the display 110 may be implemented as a cathode-ray tube (CRT), a plasma display panel (PDP), an organic light emitting diodes (OLED), a transparent OLED (TOLED) and the like. In addition, the display 110 may be implemented in a form of a touch screen which may sense a touch operation of a user.

The display 110 may display an image corresponding to the image signal provided from the image providing apparatus 200. In addition, the display 120 may display various UI elements which are stored in the display device 100.

The communicator 120 performs a wireless or wired communication with various types of external apparatuses. The communicator 120 may include a communication circuit which can perform a communication with the external apparatuses.

In detail, the communicator 120 includes a first communicator 121 for communicating with the image providing apparatus 200 and a second communicator 120 for communicating with the remote controller 130. For instance, the c first communicator 121 receives an image signal from the image providing apparatus 200 and the second communicator 122 receives a signal of the remote controller 300.

There is no limitation for a communication method used by the first communicator 121 and the second communicator 122. The first communicator 121 may communicate with the image providing apparatus 200 via a wired or wireless communication method such as a HDMI, a Digital Visual Interface (DVI), a Mobile High-Definition Link (MHL), a Universal Serial Bus (USB), Wi-Fi, a ultra wideband (UWB), a Wireless Display (WiDi), a Wireless HD (WiHD), a Wireless Home Digital Interface (WHDI), Miracast, a Wireless Gigabit Alliance (WiGig), Wi-Fi Direct, Bluetooth and the like. The second communicator 122 may communicate with the remote controller 300 via a wired or wireless communication method such as Wi-Fi, Wi-Fi Direct, Bluetooth, a USB, a HDMI, a MHL, a Display Port (DP), a Thunderbolt and the like.

The display device 100 may transmit a control signal to the image providing apparatus 200 or to the remote controller 300 via one of the first communicator 121 and the second communicator 122. For example, the control signal may be transmitted to the image providing apparatus 200 via the first communicator 121 using the HDMI method, and the control signal may be transmitted to the image providing apparatus 200 via the second communicator 122 using Bluetooth, Wi-Fi or infrared communication method.

The communicator 120 may further include a third communicator which accesses an external apparatus via Local Area Network (LAN) or internet network.

Meanwhile, the communicator has been described as being divided into the first communicator and the second communicator, but the communicator may be implemented as one hardware component.

The processor 130 controls an overall operation of the display device 100.

For example, the processor 130 may include a central processing unit (CPU), a random access memory (RAM), a read only memory (ROM) and a system bus. Here, the ROM is an element that stores a command set for system booting, and the CPU boots a system by copying an operating system (OS) stored in a storage unit of the display device 100 into the RAM and executing the OS, according to the command stored in the ROM. Once the system is completely booted, the CPU may perform various operations by copying various types of applications stored in the storage unit into the RAM and executing the applications. The processor 130 has been described above as including merely one CPU, but the processor 130 may be implemented as a plurality of CPUs (or Digital Signal Processors (DSPs), System on Chips (SoCs), or the like).

The processor 130 may control the display 110 to display an image corresponding to an image signal provided by the external device via the first communicator 121.

The processor 130 may perform a channel scroll function according to a control signal for the channel scroll which is transmitted from the remote controller 300. Here, the control signal for the channel scroll may be the control signal which is transmitted in the case in which the operation of selecting a specific button disposed in the remote controller 300 and maintaining the selection, that is, a long press operation, is input. The channel scroll function may be called as a display function of a UI for changing a channel. If the channel scroll function is performed, the UI for changing a channel is displayed, and an indicator in the UI for changing a channel moves toward a direction corresponding to the control signal for the channel scroll and searches a channel. The UI for changing a channel may be called as a channel scroll UI.

In this case, the processor 130 may activate the channel scroll function only for an image of which channel can be changed. The processor 130 may identify whether the channel of the image, which is displayed on the display 110, is changeable, on the basis of an object included in the image.

If the object included in the image is, for example, a UI which is in a state that a channel is unchangeable, such as a menu UI which includes a plurality of selectable UI elements and an EPG, the processor 130 may deactivate the channel scroll function.

If the UI which informs a channel change is displayed on the display 110, the processor 130 may identify that a current image is an image of which channel is changeable. The UI which informs a channel change may be an on screen display (OSD) such as a banner which is displayed when a channel is changed. The banner may include the information of a current channel such as the name of the channel, the name of the broadcast program, a channel number and the like.

If the UI which informs a channel change is displayed on the display 110, the processor 130 may activate the display function of the UI for changing a channel. In addition, in a state in which the display function of the UI for changing a channel is activated, if the control signal for a channel scroll is received, the processor 130 may control the display 110 to display the UI for changing a channel.

After the UI for changing a channel is displayed, if the control signal for the channel scroll is not received from the remote controller 300, the processor 130 may deactivate the display function of the UI for changing a channel. In addition, in a state in which the UI which informs a channel change is displayed, if the control signal for a channel scroll is not received from the remote controller 300 and the UI informing a channel change disappears, the display function of the UI for changing a channel may be deactivated. In a state in which the display function of the UI for changing a channel is deactivated, even if the control signal for a channel scroll is received, the UI for changing a channel is not displayed.

If an indicator displayed on the UI for changing a channel moves toward a direction corresponding to the control signal for a channel scroll and stops, the processor 130 may control the image providing apparatus 200 to change a channel to a channel corresponding to the position in which the indicator stops.

The indicator may move toward the track of a predetermined form. The track may be located on an edge of a screen, for example.

The indicator searches a channel while moving, and the information of the searched channel, for example, a channel number, a channel name, a program name broadcasted on the channel and the like may move with the indicator and be displayed. The initial position of the indicator corresponds to the channel number when the UI for changing a channel is displayed. In order to specify the initial position of the indicator, the processor 130 may recognize the channel number in an image through an optical character recognition (OCR) and the like, and the processor 130 may move the indicator from the position corresponding to the recognized channel number.

The processor 130 may control the image providing apparatus 200 to change a channel to a channel corresponding to the position in which the indicator moves and stops on the UI for changing a channel.

For example, the processor 130 may transmit a control signal corresponding to the channel which corresponds to the position in which the indicator stops, to the image providing apparatus 200 through the communicator 120. For example, the first communicator 121 which receives an image signal from the image providing apparatus 200 can be used to transmit the control signal, and the second communicator 122 also can be used to transmit the control signal. Alternatively, the control signal may be transmitted to the image providing apparatus 200 via different communication methods from the first communicator 121 and the second communicator 122.

For another example, the processor 130 transmits a control command corresponding to the channel which corresponds to the position in which the indicator stops, to the remote controller 300 through the communicator 120. Here, the control command may be a control command which causes the remote controller 300 to transmit the control signal which controls the image providing apparatus 200 to change a channel to the channel corresponding to the position in which the indicator stops. For example, the processor 130 may transmit the control command via the second communicator 122 and the first communicator 121. Alternatively, the control command may be transmitted to the remote controller 300 via different communication methods from the first communicator 121 and the second communicator 122.

A user operation to transmit the control signal for a channel scroll in the remote controller 300 will be described below.

Figure 7A:
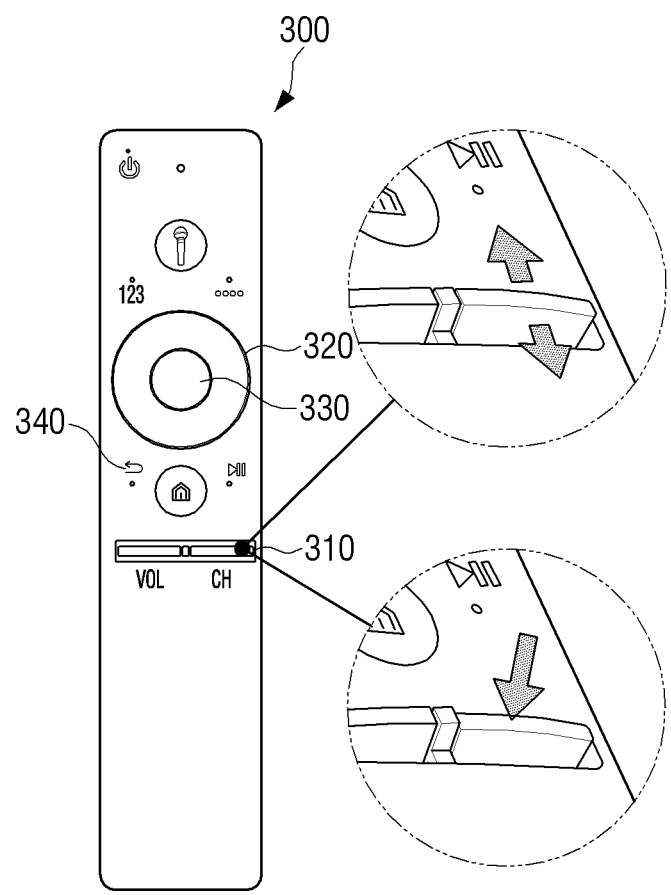
FIGS. 7A to 7C are views to illustrate a remote controller according to various exemplary embodiments.

FIG. 7A is a view to illustrate the remote controller 300 according to an exemplary embodiment.

Referring to FIG. 7A, the remote controller 300 according to an exemplary embodiment includes various types of buttons including a channel button 310, a direction button 320, a selection button 330, a cancel button 340 and the like. The channel button 310 is a lever type button which may move up and down. A channel can be changed by moving the channel button 310 up and down. In addition, if the channel button 310 is pressed, an EPG may be displayed on the display device 100, for example.

According to an exemplary embodiment, the control signal for a channel scroll may be transmitted if a user moves the channel button 310 upward and maintains the moved state for a predetermined time, or moves the channel button 310 downward and maintains the moved state for a predetermined time.

Figure 7B:
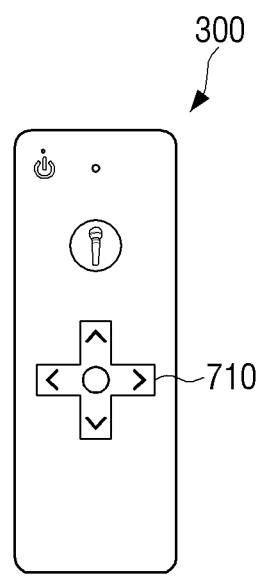

FIG. 7B is a view to illustrate the remote controller 300 according to another exemplary embodiment.

Referring to FIG. 7B, the remote controller 300 includes a direction button 710. The control signal for a channel scroll may be transmitted if a user presses a left or right direction key in the direction button 710 and maintains the pressed state, or if a user presses an up or down direction key and maintains the pressed state.

Figure 7C:
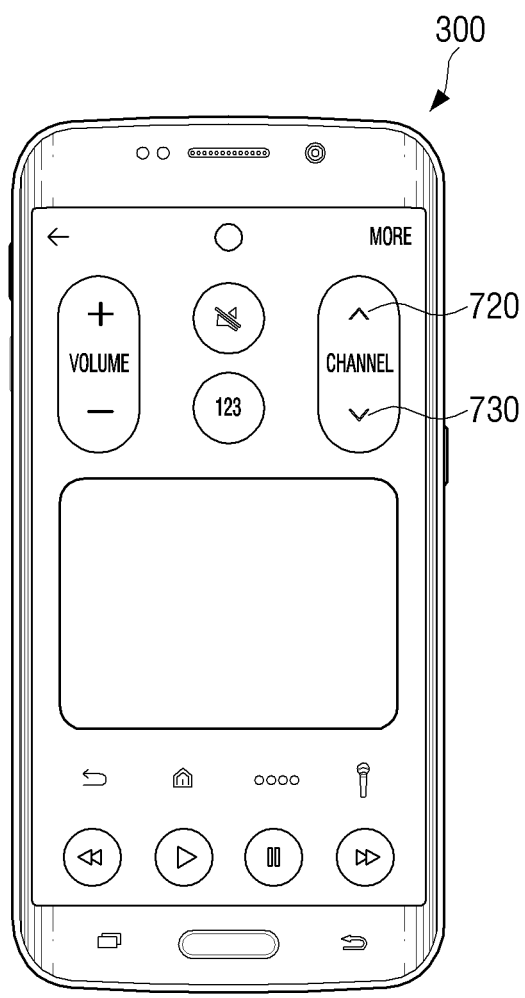

FIG. 7C is a view to illustrate the remote controller 300 according to another exemplary embodiment.

Referring to 7C, the remote controller 300 according to an exemplary embodiment may be a smart phone, and the operations of the remote controller 300 described in the embodiment may be implemented by an application which is installed and executed in the smart phone. The application may be installed in the smart phone in advance, or installed by a user separately. FIG. 7C illustrates an example of the UI screen when an application is executed in the remote controller 300 which is implemented as a smart phone. A user may control various external devices such as the display device 100, the image providing apparatus 200 and the like through the UI screen provided by the application.

For example, if a user touches a channel up soft button 720 or a channel down soft button 730 and maintains the touched state for a predetermined time, the control signal for a channel scroll may be transmitted.

According to another embodiment, the remote controller 300 includes a motion sensor, and if the remote controller 300 is moved to one direction, the control signal for a channel scroll may be transmitted. According to another embodiment, the remote controller 300 includes a touch pad, and if the operation of touching and dragging to one direction is input on the touch pad, the control signal for a channel scroll may be transmitted.

It is possible to use the channel scroll function with the specific user operation in the remote controller of different form from the form shown in FIGS. 7A to 7C. For convenience of explanation, an embodiment will be described below based on the remote controller explained in FIG. 7A.

Figure 8:
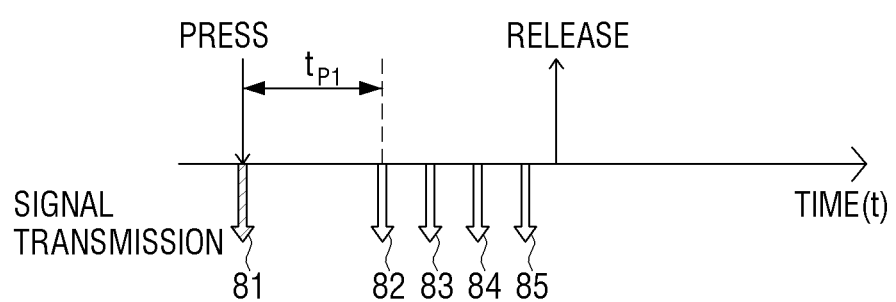
FIGS. 8 to 9C are views to illustrate a control signal transmission of a remote controller according to various exemplary embodiments.
Figure 9A:
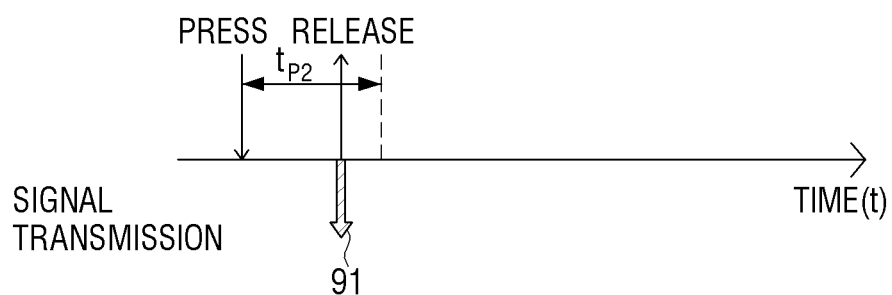
Figure 9B:
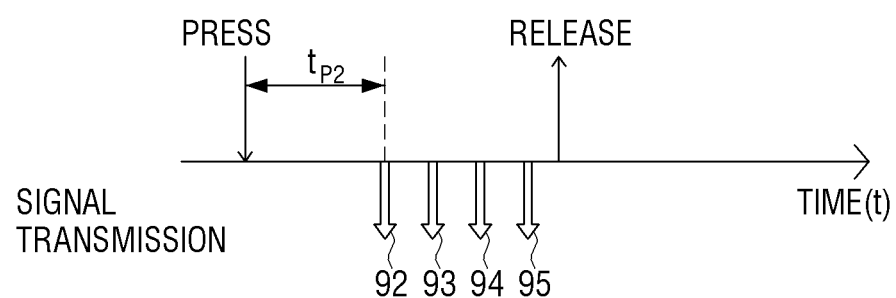
Figure 9C:
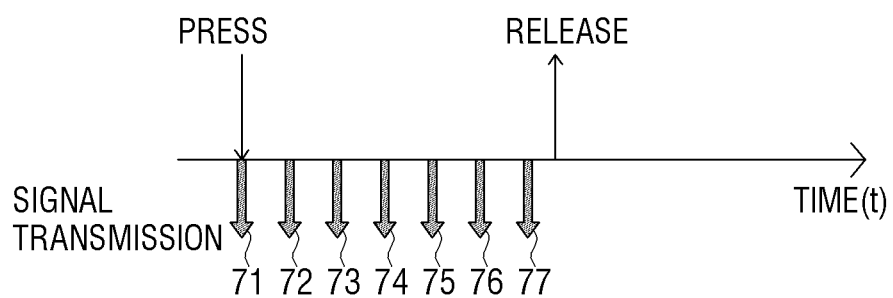

FIGS. 8 to 9C are views to illustrate a method for transmitting a control signal in the remote controller 300 while a user moves a channel button 310 up or down and maintains the moved state in the remote controller 300, according to various exemplary embodiments.

Referring to FIG. 8, at the moment that a user pushes the channel button 310 up or down in the remote controller 300, the remote controller 300 transmits a control signal 81 for changing a channel. After then, if it is determined that the user pushes the channel button 310 up or down and maintains the pushed status for a predetermined time ($t_{P1}$), the remote controller 300 continuously transmits control signals (82 to 85) for a channel scroll until the channel button 310 is released.

Meanwhile, in FIG. 8, it is described that the control signal 81 for changing a channel is transmitted for one time until the predetermined time ($t_{P1}$) passes, but the control signal 81 may be transmitted for a plurality of times.

FIGS. 9A to 9B illustrate an exemplary embodiment different from the exemplary embodiment described in FIG. 8. In FIGS. 9A to 9B, at the moment that a user pushes the channel button 310 up or down, the remote controller 300 does not transmit the control signal for changing a channel, and as illustrated in FIG. 9A, if the button is released before a predetermined time ($t_{P2}$) passes, a control signal 91 for changing a channel is transmitted. If the button is released after the predetermined time ($t_{P2}$) passes, the remote controller 300 continuously transmits control signals (92 to 95) for a channel scroll until the button is released after the predetermined time ($t_{P2}$) passes, as illustrated in FIG. 9B.

The control signals 81 and 91 for changing a channel are control signals for controlling the image providing apparatus 200, and the control signals 82 to 85, or 92 to 95 for a channel scroll are control signals for controlling the display device 100.

The image providing apparatus 200 which receives the control signals 81 and 91 for changing a channel may perform different operations according to which image the image signal currently provided to the display device 100 corresponds to. For example, if the control signals 81 and 91 for changing a channel are received in a state in which an image provided to the display device 100 by the image providing apparatus 200 is an image of which channel is changeable (e.g., an image of a specific channel), the image providing apparatus 200 converts a channel to the next channel and provides an image signal of the converted channel to the display device 100. For another example, if the control signals 81 and 91 for changing a channel are received in a state in which an image provided by the image providing apparatus 200 to the display device 100 is an image of which channel is unchangeable (e.g., a channel guide, a game application image and the like), the image providing apparatus 200 may ignore the control signals 81 and 91 for changing a channel or perform other predetermined operations (e.g., scrolling the list of EPG).

If the control signal for changing a channel is not transmitted, and a button is released before a predetermined time ($t_{P2}$) passes as illustrated in FIG. 9A, a control signal 91 for changing a channel is transmitted when the button is released. If the button is released after the predetermined time ($t_{P2}$) passes, the remote controller 300 continuously transmits the control signals 92 to 95 for a channel scroll until the button is released after the predetermined time ($t_{P2}$) passes, as illustrated in FIG. 9B.

FIG. 9C illustrates an exemplary embodiment which is different from the exemplary embodiments of FIGS. 8 to 9B. In FIG. 9C, the remote controller 300 transmits control signals 71 to 77 for changing a channel from the moment that a user pushes the channel button 310 up or down to the moment that the user releases the channel button 310. The control signals 71 to 77 for changing a channel are control signals to control the display device 100. The image providing apparatus 200 does not react to the control signals 71 to 77.

If a first control signal 71 is received, the display device 100 may control the image providing apparatus 200 so as to provide the image signal of the changed channel. Thereafter, if a following control signal 72 is received within a predetermined time, the display device 100 determines that a channel button on the remote controller 300 is long pressed, and identifies whether to perform a channel scroll operation rather than changing a channel. Specifically, the display device 100 identifies whether a currently displayed image is an image of which channel is changeable based on an object included in the currently displayed image, and displays a UI for changing a channel if the channel of the image is changeable, and does not display the UI for changing a channel if the channel of the image is unchangeable. This exemplary embodiment will be described below with reference to FIG. 10.

According to another exemplary embodiment, the display device 100 does not perform an operation for changing a channel right after the first control signal 71 is received, but the display device 100 waits for the following control signal 72 to be received within a predetermined time, and when the following control signal 72 is received, identifies whether to perform a channel scroll operation. That is, unlike the exemplary embodiment described above, a channel is not changed according to the first control signal. This exemplary embodiment will be described in detail with reference to FIG. 12.

Figure 10:
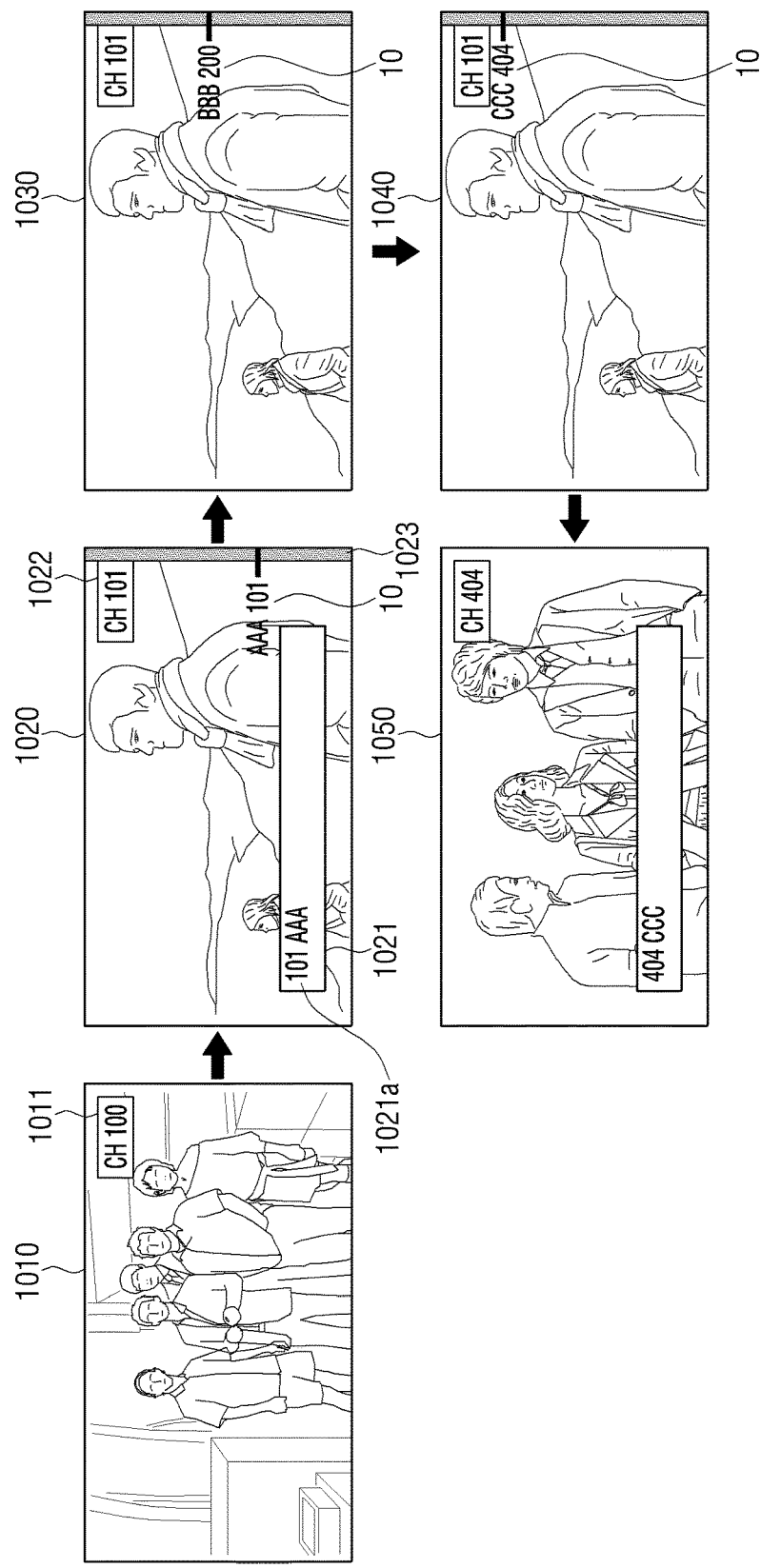

FIG. 10 is a view to illustrate a changing process of an image in the display device 100 when the remote controller 300 transmits control signals as described in FIG. 8, or when the remote controller 300 transmits control signals as described in FIG. 9C.

Referring to FIG. 10, in a state 1010 in which the image of a channel 100 provided from the image providing apparatus 200 is displayed on the display device 100, if the remote controller 300 transmits the control signal 81 for changing a channel, and the control signal 81 is a control signal for turning the channel up, the image providing apparatus 200 provides an image of channel 101, which is the next channel, to the display device 100, and the display device 100 displays the image of the channel 101, in operation 1020.

Meanwhile, in a case in which the remote controller 300 transmits the control signal 71 for changing a channel, since the control signal 71 may be recognized by the display device 100, not by the image providing apparatus 200, the display device 100 receives the control signal 71 and transmits the control signal 71 to provide the image of the next channel to the image providing apparatus 200, and the image providing apparatus 200 receive the control signal 71 and provides the image of the next channel, channel 101, to the display device 100 in operation 1020.

Through an image analysis, the display device 100 may identify whether a channel is changed. For example, if a UI which informs a channel change is displayed, the display device 100 may identify that the channel is changed. The UI which informs a channel change may include, for example, a banner, a changed channel number and the like.

For example, if a channel is changed, a banner 1021 which includes information of the changed channel may be displayed. If the banner 1021 is detected in an image, the display device 100 may determine that the channel is changed. For a specific example, the display device 100 stores learning data based on convolutional neural network (CNN), and the learning data may be generated by learning types of banners for each entrepreneur of the image providing apparatus. The type of a banner may be determined based on a form of the banner, a displayed position of the banner, a type of the banner and the like. The learning data may be relearned according to a form, a type, a displayed position of the banner to be detected. The display device 100 may download the relearned data and update existing data. The display device 100 may capture the image provided by the image providing apparatus 200 and detect the banner 1021 from the captured image by using information on the entrepreneur of the image providing apparatus 200 and the stored learning data.

For another example, the display device 100 may detect the banner 1021 by using a template matching. In detail, the display device 100 captures the image provided from the image providing apparatus 200, and detects the banner 1021 on the basis of a pre-defined area and pixel information in the captured image, by using a pre-stored template.

The display device 100 may identify whether there is the UI which informs a channel change not only for the pre-defined area in an image but also for an entire area of the image. For example, the display device 100 may operate based on an artificial intelligence, and the display device 100 may identify itself portion of the entire area of a captured image where the UI which informs a channel change (e.g., a banner, a channel number, a broadcaster logo and the like) exists, based on the artificial intelligence, and recognize the corresponding information.

For another example, if the control signal 81 for changing a channel is an infrared signal, the display device 100 may perform an IR sniffing on the control signal 81 for changing a channel, and recognize channel numbers 1011 and 1022 by using an OCR and the like in an image 1010 which is displayed before sniffing the signal and an image 1020 which is displayed after sniffing the signal. If the sniffed control signal 81 is identified as a control signal for turning a channel up, and it is identified that the channel number 1011 recognized in an image before sniffing the signal and the channel number 1022 recognized in an image after sniffing the signal are different from each other, the display device 100 may determine that the channel is changed.

The reason why the display device 100 identifies whether the channel is changed through the image analysis, as described in the above, is to identify whether an image provided from the image providing apparatus 200 and currently displayed is an image of which channel is changeable. If a channel scroll function for an image of which channel is unchangeable (e.g., an image which includes a menu such as an EPG or an image executing a game application and the like) is performed and a channel scroll UI is displayed, a user may be confused, and thus the display device 100 performs the channel scroll function only if a channel is changeable, and if the channel of an image is unchangeable, the display device 100 does not perform the channel scroll function.

As described in the above, if it is determined that the remote controller 300 transmits the control signals 81 and 71 for changing a channel and thus a channel is changed, the display device 100 enables the channel scroll function. While the channel scroll function is enabled, if the control signals 82 to 85 or 72 to 77 for a channel scroll, which are transmitted by the remote controller 300, are received, the display device 100 displays a UI 1023 for changing a channel together with an image of channel 101. The UI 1023 for changing a channel may be called as a channel scroll UI. The UI 1023 for changing a channel includes an indicator 10 which searches a channel while moving up or down on the UI 1023 for changing a channel. In FIG. 10, it is illustrated that the UI 1023 for changing a channel is disposed in a longitudinal direction, but the UI 1023 may be disposed in a transversal direction and the indicator 10 may move to the left and the right. In addition, the UI 1023 for changing a channel may be disposed at any part of a screen in addition to the edge area of the screen.

When the UI 1023 for changing a channel is displayed, an initial location of the indicator 10 corresponds to a current channel number. In order to specify the initial location of the indicator 10, the display device 100 has to identify the channel number of the current channel. For this, the display device 100 may recognize a channel number included in an image by using an OCR on the currently displayed image. As illustrated in a screen 1020, the channel number may be in a specific area 1022 of the screen, and may be in a specific area 1021a in the banner 1021. Locations of the channel number may be different according to the entrepreneur of an image providing apparatus. Accordingly, the display device 100 may obtain entrepreneur information of the image providing apparatus 200 and select a channel number area corresponding to the entrepreneur information of the image providing apparatus 200 and apply the OCR for the selected area. If the channel number is recognized to be 101 through OCR, the display device 100 may locate the indicator 10 on an area corresponding to channel number 101 on the UI 1023 for changing a channel. The indicator 10 may include the current channel number.

Meanwhile, the display device 100 may obtain information regarding a program aired on the current channel number based on the recognized current channel number and EPG information provided from the image providing apparatus 200, and include and display the obtained information in the indicator 10. For example, the indicator 10 may include a program name AAA.

The display device 100 may move an indicator proportionally to the number of reception of the control signals 82 to 85 or 72 to 77 for a channel scroll. For example, if a user pushes a channel button 310 upward and maintains the pushed state, the indicator moves upward on the UI 1023 for changing a channel, and if a user pushes the channel button 310 downward and maintains the state, the indicator moves downward on the UI 1023 for changing a channel. While the indicator 10 moves, program names of the searched channels, BBB and CCC, may be displayed.

If the control signal for a channel scroll is not transmitted from the remote controller 300 any longer, the display device 100 stops the movement of the indicator 10 in operation 1040. The display device 100 controls the image providing apparatus 200 to convert a channel into a channel 404 which corresponds to the position in which the indicator 10 stops, receives an image of the channel 404 from the image providing apparatus 200 and displays the image, and removes the UI 1023 for changing a channel in operation 1050.

The display device 100 may deactivate the channel scroll function if the event which causes the UI 1023 for changing a channel to disappear while the channel scroll function is activated. The event which causes the UI 1023 for changing a channel to disappear may occur, for example, when a control signal for a channel scroll is not received while a predetermined time passes, when a control signal corresponding to the selection button 330 shown in FIG. 7A is transmitted from the remote controller 300 or when a control signal corresponding to the cancel button 340 shown in FIG. 7A is transmitted from the remote controller 300.

For another example, while the UI 1023 for changing a channel is not displayed and the channel scroll function is activated, if the UI which informs a channel change disappears, the display device 100 may deactivate the channel scroll function. For example, while the UI 1023 for changing a channel is not displayed and the channel scroll function is activated, if a banner displayed when a channel is changed disappears, the display device 100 deactivates the channel scroll function. The display device 100 may detect the disappearance of the banner by using learning data based on the CNN or using a template matching method.

Figure 11:

Unlike the case of FIG. 10, FIG. 11 is a view to illustrate the operation of the display device 100 in a case in which the remote controller 300 transmits control signals as illustrated in FIG. 8, in a state in which an image of which channel is unchangeable is displayed.

Referring to FIG. 11, an EPG 1100, which is an image of which channel is unchangeable, is displayed on the display device 100. For example, if the channel button 310 is pressed in the remote controller 300 as illustrated in FIG. 7A, the EPG 1100 may be displayed on the display device 100. As illustrated in FIG. 10 in the above, the channel scroll function is activated in a case in which, for example, there is an event in which a channel is changed, and otherwise, the channel scroll function is deactivated, and thus while the EPG 1100 is displayed, the channel scroll function is in a deactivated state.

While the EPG 1100 is displayed, if the remote controller 300 transmits the control signal 81 for changing a channel, the image providing apparatus 200 may ignore the control signal 81 or highlight a specific item in the EPG 1100, or perform an operation of turning over the page of the EPG 1100. Thereafter, even if the remote controller 300 transmits control signals 82 to 85 for a channel scroll and the display device 100 receives the control signals, since the channel scroll function is deactivated, the channel scroll function is not performed. Alternatively, operations of highlighting items in the EPG 1100 or turning over pages in order may be performed. Accordingly, the UI for changing a channel as illustrated in FIG. 10 may not be displayed.

Figure 12:
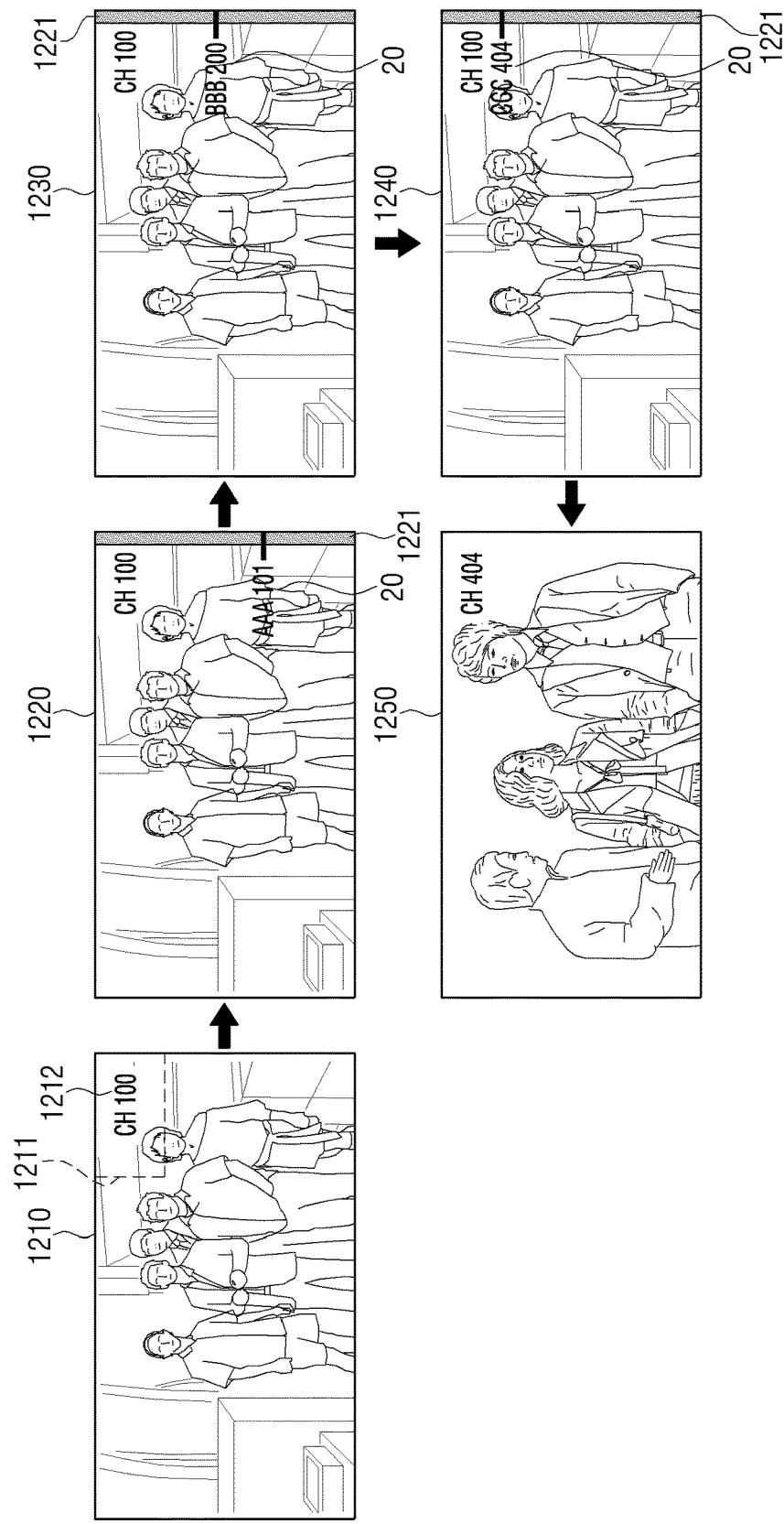

FIG. 12 illustrates an exemplary embodiment different from an exemplary embodiment illustrated in FIG. 10. FIG. 12 illustrates a changing process of the image in the display device 100 in a case in which the remote controller 300 transmits control signals as illustrated in FIG. 9B, or the remote controller 300 transmits control signals as illustrated in FIG. 9C.

Referring to FIG. 12, in a state 1210 in which an image of a channel 100 provided by the image providing apparatus 200 is displayed on the display device 100, if the remote controller 300 transmits control signals 92 to 95 for a channel scroll or control signals 71 to 77 for changing a channel, the display device 100 identifies whether the currently displayed image is an image in which a channel is changeable. In this embodiment, different from the exemplary embodiment illustrated in FIG. 10, the display device 100 does not control the image providing apparatus 200 for changing a channel as soon as the control signal 71 for changing a channel is received, but the display device 100 waits for the following control signal 72 to be received within a predetermined time, and if it is identified that the following control signal 72 is received, the display device 100 determines the control signals 71 to 77 which are successively received to be control signals for a channel scroll.

According to whether there is an object which indicates that the channel of the image is changeable in the currently displayed image, or there is an object which indicates that the channel of the image is unchangeable in the currently displayed image, the display device 100 may identify whether the currently displayed image is an image of which channel is changeable. The object which indicates that an image of which channel is changeable may include, for example, a channel number, a broadcast logo, a UI which informs that a channel is changed (e.g., a banner), etc. The object which indicates that an image of which channel is unchangeable may include, for example, an EPG, a specific application image (e.g., a game application, a video call application and the like), etc.

The display device 100 may identify whether the object which indicates that the channel of the image is changeable, or the object which indicates that the channel of the image is unchangeable is included in the image, based on pre-stored learning data. Alternatively, the display device 100 may identify whether the object which indicates that the channel of the image is changeable, or the object which indicates that the channel of the image is unchangeable is included in the image, based on a template matching method. Alternatively, the display device 100 may operate based on an artificial intelligence, and may identify itself whether the object which indicates that the channel of the image is changeable, or the object which indicates that the channel of the image is unchangeable is included in an image based on the artificial intelligence, and recognize the corresponding information.

Specifically, if a control signal 92 for a channel scroll or a control signal 71 for changing a channel is received, the display device 100 captures a currently displayed image and identifies whether the object which indicates that the channel of the image is changeable is in a preset area in the captured image. The displayed location of the object which indicates that the channel of the image is changeable, may be different according to the entrepreneur of the image providing apparatus 200. Accordingly, the display device 100 may obtain entrepreneur information of the image providing apparatus 200, select a location 1211 in which an object is detected in the captured image based on the obtained information, and analyze whether there is the object which indicates that the channel of the image is changeable, such as, for example, a channel number 1212, in the selected detected location. In this case, the CNN learning data or template matching method may be used.

Alternatively, the display device 100 may identify whether an object which indicates that a channel is unchangeable, for example, an EPG, is included in the captured image, and if the object is not included in the captured image, it may be determined that the channel of the captured image is changeable.

If it is identified that the channel of the currently displayed image is changeable, the display device 100 displays a UI for changing a channel 1221.

Meanwhile, as illustrated in the above, an operation that the display device 100 identifies whether an image of a channel is changeable may be performed on a condition that a control signal is received from the remote controller 300. Alternatively, the display device 100 identifies in advance whether the current image is an image of which channel is changeable regardless of whether the control signal is received from the remote controller 300, and if the control signal is received later, the display device 100 identifies whether to display the UI for changing a channel based on the predetermined result. In this case, the display device 100 identifies whether the image corresponding to the image signal, which is periodically input from the image providing apparatus 200 in every preset period, is an image of which channel is changeable, and if the control signal is received from the remote controller 300, the display device 100 may determine whether to display the UI for changing a channel based on the result identified right before the reception of the control signal.

The UI 1221 for changing a channel may include an indicator 20 which moves while searching a channel.

The initial position of the indicator 20 corresponds to the current channel number. In order to specify the initial position of the indicator 20, the display device 100 has to identify the current channel number. For this, the display device 100 may recognize the channel number included in the image by using an OCR on a currently displayed image. If it is identified that the current channel number is 100, the display device 100 may locate the indicator 20 on the position corresponding to the channel number 100 on the channel scroll UI 1221.

The display device 100 may move and display the indicator 20 on the UI 1221 for changing a channel proportionally to the number of the reception of the control signals 92 to 95 for a channel scroll or the number of the reception of the control signals 71 to 77 for changing a channel in operations 1230 and 1240. If the channel button 310 is pushed upward and the pushed state is maintained, the indicator 20 moves upward on the UI 1221 for changing a channel, and if a channel button 310 is pushed downward and this state is maintained, the indicator 20 moves downward on the UI 1221 for changing a channel.

If the control signal for a channel scroll or the control signal for changing a channel is not transmitted from the remote controller 300 anymore, the display device 100 stops the movement of the indicator 20. The display device 100 controls the image providing apparatus 200 to change a channel to a channel 404 which corresponds to the position in which the indicator 20 stops, receives an image of the channel 404 from the image providing apparatus 200 and displays the image, and removes the channel scroll UI 1221 in operation 1250.

Different from FIG. 12, FIG. 13 illustrates a changing process of an image in the display device 100 when the remote controller 300 transmits control signals as described in FIG. 9B, or when the remote controller 300 transmits control signals as described in FIG. 9C, in a state in which an image of which channel is unchangeable is displayed.

Referring to FIG. 13, while the EPG 1300 is displayed on the display device 100, if the remote controller 300 transmits the control signal 92 for a channel scroll or a control signal 71 for changing a channel, it may be identified whether there is an object which indicates that the channel of the image is changeable or there is an object which indicates that the channel of the image is unchangeable in the captured image, by capturing the currently displayed image, as illustrated above through FIG. 12. Comparing to FIG. 12, in FIG. 13, the channel number, which is the object that indicates that the channel of the image is changeable, is not in a preset area 1311, and thus the display device 100 may determine that the EPG 1300 is the image of which channel is unchangeable. Alternatively, if the display device 100 stores a template which identifies a layout of the EPG as an example of the object which indicates that a channel is unchangeable, and if it is identified that the stored template matches the EPG 1300, the display device 100 may identify that the EPG 1300 is the image of which channel is unchangeable.

If the control signals 92 to 95 for a channel scroll or control signals 71 to 77 for changing a channel are received in a state in which an image of which channel is unchangeable is displayed, the display device 100 does not display the UI for changing a channel. Alternatively, the display device 100 may perform another operation. For example, the display device 100 may perform an operation of turning a page of the EPG 1300.

Hereinafter, a method in which the display device 100 controls the image providing apparatus 200 to change a channel to a channel corresponding to the position in which the indicators 10 and 20 stop will be described.

The display device 100 may control the image providing apparatus 200 to change a channel to the channel corresponding to the position in which the indicators 10 and 20 stop in various ways. For example, the display device 100 may directly control the image providing apparatus 200. This case is the case described in FIG. 4. For another example, the display device 100 may control the image providing apparatus 200 indirectly through the remote controller. This case is the case described in FIG. 5 above.

First, for example, in a case in which the display device 100 directly controls the image providing apparatus 200, the display device 100 may transmit the control signal which changes a channel to a channel number 404, which corresponds to the position in which the indicators 10 and 20 stop in FIG. 10 or 12, to the image providing apparatus 200 using an infrared communication method. Specifically, the display device 100 stores a control cod set to control the image providing apparatus 200, transmits the infrared signal corresponding to number 4 based on the control code set, transmits the infrared signal corresponding to number 0, and transmits the infrared signal corresponding to number 4. The image providing apparatus 200 which received the infrared signals corresponding to the numbers "4", "0" and "4", which are transmitted in order from the display device 100, may provide the image corresponding to channel 404 to the display device 100.

For another example, in a case in which the display device 100 indirectly controls the image providing apparatus 200 through the remote controller 300, the display device 100 transmits a control command to control the remote controller 300 to transmit the control signal corresponding to the channel number 404 which corresponds to the position in which the indicators 10 and 20 stops in FIG. 10 or 12, using, for example, a Bluetooth communication method, to the remote controller 300. The remote controller 300 which received the control command stores the control code set to control the image providing apparatus 200, and the remote controller 300 transmits an infrared signal corresponding to number 4 based on the control code set, transmits the infrared signal corresponding to number 0, and transmits the infrared signal corresponding to number 4. The image providing apparatus 200 which received the infrared signals corresponding to the numbers "4", "0" and "4" which are transmitted in order from the remote controller 300, may provide the image corresponding to channel 404 to the display device 100.

Figure 14:
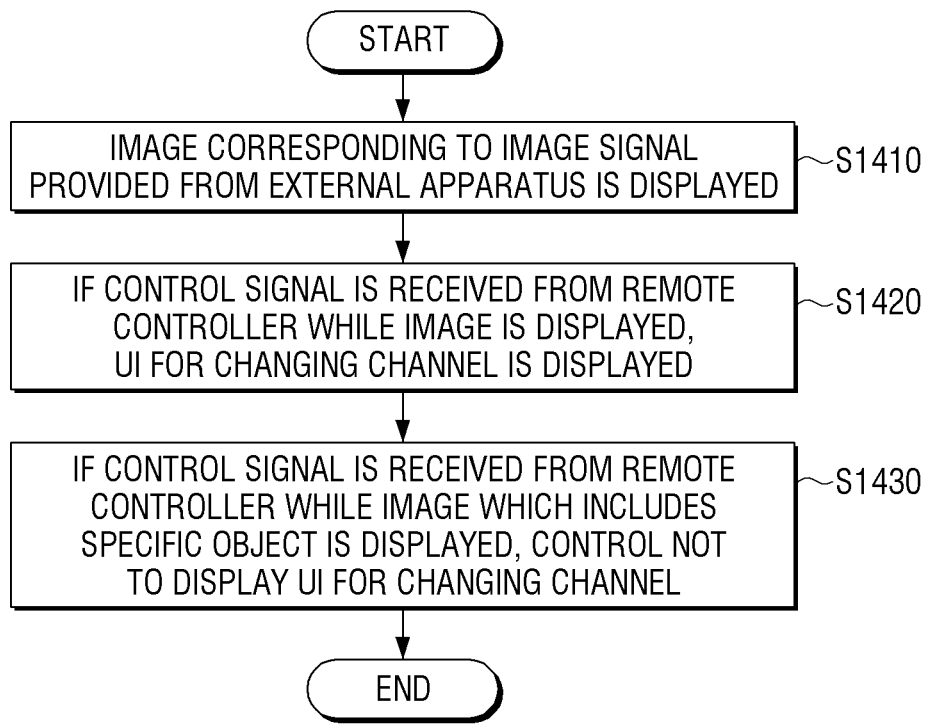
FIG. 14 is a flowchart to illustrate a control method of a display device according to an exemplary embodiment.

FIG. 14 is a flowchart to illustrate a control method of the display device according to an exemplary embodiment. The flowchart illustrated in FIG. 14 may be composed of operations processed in the display device 100 and 100' illustrated in exemplary embodiments. Accordingly, the description regarding the display device 100 and 100' may be applied to the flowchart illustrated in FIG. 14, even if the description is omitted below.

Referring to FIG. 14, the display device 100 displays the image corresponding to the image signal provided by an external device in operation S1410. Here, the external apparatus corresponds to the image providing apparatus 200 described above.

If the control signal is received by the remote controller 300 in a state in which an image is displayed, the display device 100 displays a UI for changing a channel in operation S1420. Specifically, if the control signal received from the remote controller 300 is identified to be a control signal for a channel scroll, the display device 100 displays the UI for changing a channel. However, the display device 100 analyzes an image corresponding to the image signal provided from the external device, and displays the UI for changing a channel only if the image is an image of which channel is changeable.

If a control signal is received from the remote controller 300 in a state in which an image including a specific object is displayed, the display device 100 controls not to display the UI for changing a channel in operation S1430. Here, the specific object is an object which indicates that the channel of the image is unchangeable. The display device 100 may detect the specific object based on a pre-stored template, and may use learning data (e.g., learning data based on the CNN) which may detect the specific object.

Figure 3A:
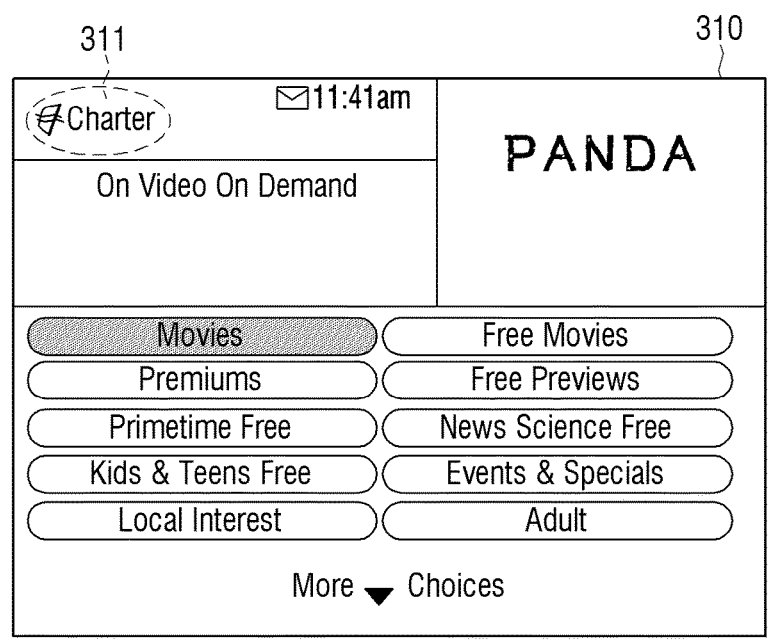
Figure 3B:
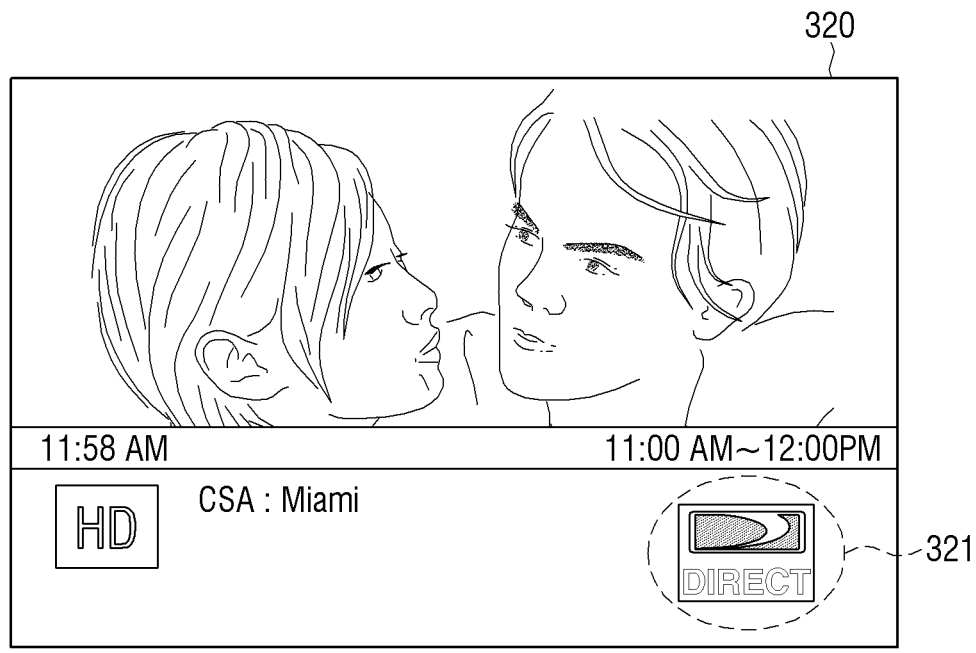

The specific object may be, for example, a menu UI 310 which includes a plurality of selectable UI elements such as movies, free movies, premiums and so on, as illustrated in FIG. 3A. Alternatively, the specific object may be, for example, the EPG 1100 as illustrated in FIG. 11. However, it is not limited thereto, but any image of which channel is unchangeable may be the specific object.

Meanwhile, the display device 100 may identify that a currently displayed image is an image of which channel is changeable by detecting an object which indicates that the channel of the image is changeable. The object which indicates that the channel of the image is changeable may be, for example, a banner displayed when a channel is changed.

According to the above exemplary embodiments, the display device 100 recognizes a situation where the UI for changing a channel (the channel scroll UI) is needed, and enables the UI for changing a channel to operate only in a specific situation.

Figure 15:
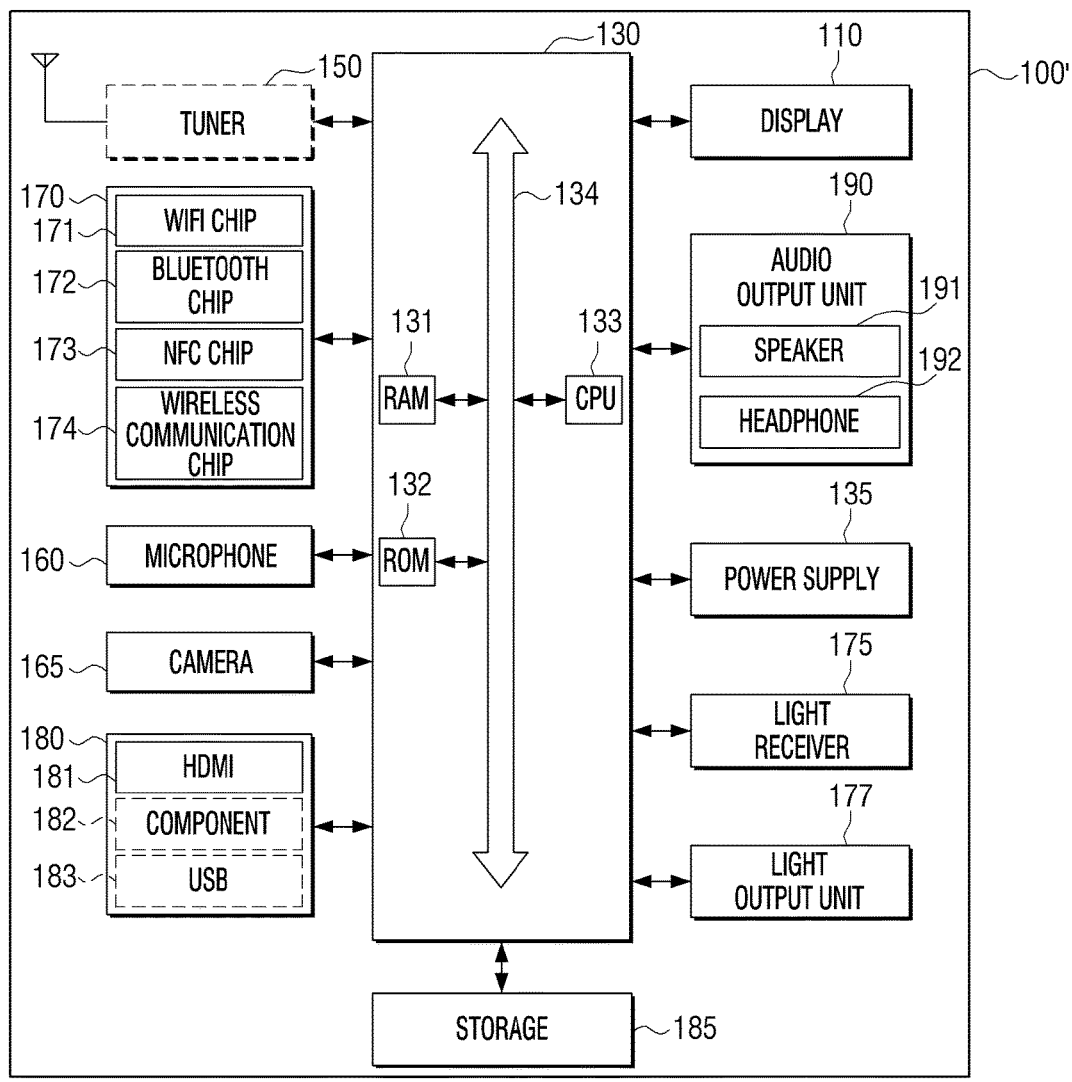
FIG. 15 is a block diagram to illustrate a display device according to another exemplary embodiment.

FIG. 15 is a block diagram to illustrate a display device 100' according to another exemplary embodiment.

The display device 100' may be implemented in an analog TV, a digital TV, a 3D-TV, a smart TV, an LED TV, an OLED TV, a plasma TV, a monitor, a curved TV having the fixed curvature of the screen, a flexible TV having the fixed curvature of the screen, a bended TV having the fixed curvature of the screen, and/or curvature modifiable TV in which the curvature of the current screen can be modified by the received user input. However, it is not be limited to the above.

The display device 100' includes the display 110, a tuner 150, the processor 130, a wireless communicator 170, an input/output unit 180, an audio output unit 190, a storage 185, a microphone 160, a camera 165, a power supply 135, a light receiver 175 and a light output unit 177. The display device 100' may include a sensor which detects an inner state or an external state of the display device 100' (e.g., a light sensor, a temperature sensor and the like, which are not illustrated).

Regarding the broadcast signal received by wire or wireless transmissions, the tuner 150 may tune and select only the channel frequency to be received by the display device 100' among the various wave components through an amplification, a mixing and a resonance. The broadcast signals may include a video, an audio, and additional data (e.g., electronic program guide (EPG)).

The tuner 150 may receive a video, an audio and data in a frequency band corresponding to the channel number which corresponds to a user input.

The tuner 150 may receive broadcast signals from various sources such as a ground wave broadcast, a cable broadcast, a satellite broadcast, an internet broadcast, and so on. Further, the tuner 150 may receive broadcast signals from sources such as an analog broadcast or a digital broadcast.

The tuner 150 may be implemented to be all-in-one with the display device 100' or a separate device including a tuner unit electrically connected to the display device 100' (e.g., a set-top box or a tuner connected to the input/output unit 180).

The wireless communicator 170 performs communication with various types of external devices according to various types of communication schemes. The wireless communicator 170 may include various types of communication chips such as a WiFi chip 171, a Bluetooth chip 172, a Near Field Communication (NFC) chip 173, and a wireless communication chip 174. The Wi-Fi chip 171, the Bluetooth chip 172 and the NFC chip 173 may perform communication using a Wi-Fi method, a Bluetooth method and a NFC method, respectively. The wireless communication chip 174 means a chip that performs communication according to various communication standards such as Institute of Electrical and Electronics Engineers (IEEE), ZigBee, 3rd generation (3G), 3rd generation partnership project (3GPP), LTE, and the like.

The microphone 160 may receive a voice, change the received voice into the electrical signal, and output the electrical signal to the processor 130. Especially, the user voice may be received via the microphone 160, and the processor 130 may perform an operation corresponding to the received user voice.

The microphone 160 may be embedded in the display device 100' or be separated from the display device 100'. The separated microphone 160 may be electrically linked to the display device 100'.

The camera 165 may film a video, and the filmed video may be used to recognize a motion of a user. The camera 165 may be embedded in the display device 100' or be separated from the display device 100'. The separated camera may be electrically linked to the display device 100'.

The input/output unit 180 is linked with an external apparatus.

The input/output unit 180 may include at least one of a High-Definition Multimedia Interface (HDMI) input port 181, a component input jack 182 and a Universal Serial Bus (USB) port 183. In addition to the above, the input/output unit 180 may include at least one of ports such as Red Green Blue (RGB), a Digital Visual Interface (DVI), HDMI, a Display Port (DP), a thunder bolt and the like.

The audio output unit 190 outputs an audio. The audio output unit 190 may output, for example, an audio included in a broadcast signal received through the tuner 150, the wireless communicator 170, an audio input through the input/output unit 180, or an audio included in an audio file stored in the storage 185. The audio output unit 190 may include a speaker 191 and a headphone output component 192.

The storage 185 may store various types of data, programs or applications for driving and controlling the display device 100' under control of the processor 130. The storage 185 may store the signal or the data input/output corresponding to the driving of the tuner 150, the wireless communicator 170, the microphone 160, the camera 165, the input/output unit 180, the display 110, the audio output unit 190 and the power supply 135. The storage 185 may store data for composing various UI screens provided from the display 110. In addition, the storage 185 may store data for generating a control signal corresponding to various user interactions. The storage 185 may store learning data used for detecting an object and template information.

The storage 185 may be implemented to be non-volatile memory, volatile memory, flash memory, hard disk drive (HDD) or solid state drive (SSD). The storage 185 may be implemented as an external storage medium, for example, a micro SD card, USB memory, a web server via network, etc. as well as a recording medium in the display device 100'.

The power supply 135 may supply power, which is input from an external power source, to internal components of the display device 100' by a control of the processor 130.

The processor 130 controls an overall operation of the display device 100' and a signal flow between the internal components of the display device 100', and performs a function that processes data. The processor 130 may control a power which is supplied to the internal components by the power supply 135.

The processor 130 includes a RAM 131, a ROM 132, a CPU 133 and a bus 134. The RAM 131, the ROM 132, the CPU 133 and the like may be linked to each other though the bus 134. The processor 130 may be implemented as a System On Chip (SoC).

The CPU 133 accesses the storage 185 and performs booting using an O/S stored in the storage 185. Further, the CPU 133 performs various operations using various kinds of programs, contents, and data stored in the storage 185.

The ROM 132 stores a set of instructions for booting a system, and the like. In response to a turn on command being input and power being supplied, the CPU 133 may copy an O/S stored in the storage 185 into the RAM 131 according to the command stored in the ROM 132, and boot the system by executing the O/S. If the boot sequence is complete, the CPU 133 may copy various application programs stored in the storage 185 to the RAM 131 and execute the application programs in the RAM 131 to perform various operations.

The processor 130 captures an image corresponding to the image signal provided from the image providing apparatus 200. Here, the image may be captured in a size appropriate for recognizing on object which is to be detected. In addition, the processor 130 may preprocess the captured image with a method such as adjusting size, gamma curve and the like. In addition, the processor 130 may detect the OSD based on the CNN learning data stored in the storage 185. Here, the OSD may be an OSD which indicates that an image is an image of which channel is changeable, or an OSD which indicates that an image is an image of which a channel is unchangeable. Specifically, the processor 130 detects the OSD by dividing into an upper OSD and a lower part of OSD, based on the analysis of the type of the OSD of the image providing apparatus 200. Alternatively, the processor 130 may detect the OSD based on a template matching-based method which divides the OSD and a normal screen by using a pre-defined area in the image and pixel information.

The processor 130 may detect a position of a channel number in the detected OSD and recognize a number at the position of the channel number through OCR.

If it is identified that the OSD (e.g., a banner) which indicates that a channel is changeable is displayed, and a channel number is recognized in the OSD, the channel scroll function is activated. The recognized channel number may be used as a start point of an indicator in the UI for changing a channel.

If the OSD disappears without receiving a control signal for a channel scroll while the OSD is displayed, the processor 130 may deactivate the channel scroll function. Alternatively, if the UI for changing a channel is displayed and the UI disappears because the channel selection is completed, the channel scroll function may be deactivated. The case in which a channel selection is completed is, for example, that a long press of the channel button is released in the remote controller 300, or that a selection button or a cancel button is selected in the remote controller 300.

If the channel scroll function is deactivated, the processor 130 does not display the UI for changing a channel even if the control signal for a channel scroll is received from the remote controller 300.

The light receiver 175 receives a control signal from an outside. For example, the light receiver 175 may receive an infrared control signal (e.g., IR pulse) from the remote controller 300.

The light output unit 177 outputs a control signal. For example, the light output unit 177 may output the infrared control signal.

In the embodiment described in FIG. 4, if the display device 100 receives a control signal from the remote controller 300 (②), the control signal may be received via the light receiver 175, and if the display device 100 transmits a control signal for controlling the image providing apparatus 200 which corresponds to the received control signal (③), the control signal may be transmitted via the light output unit 177.

Figure 16:
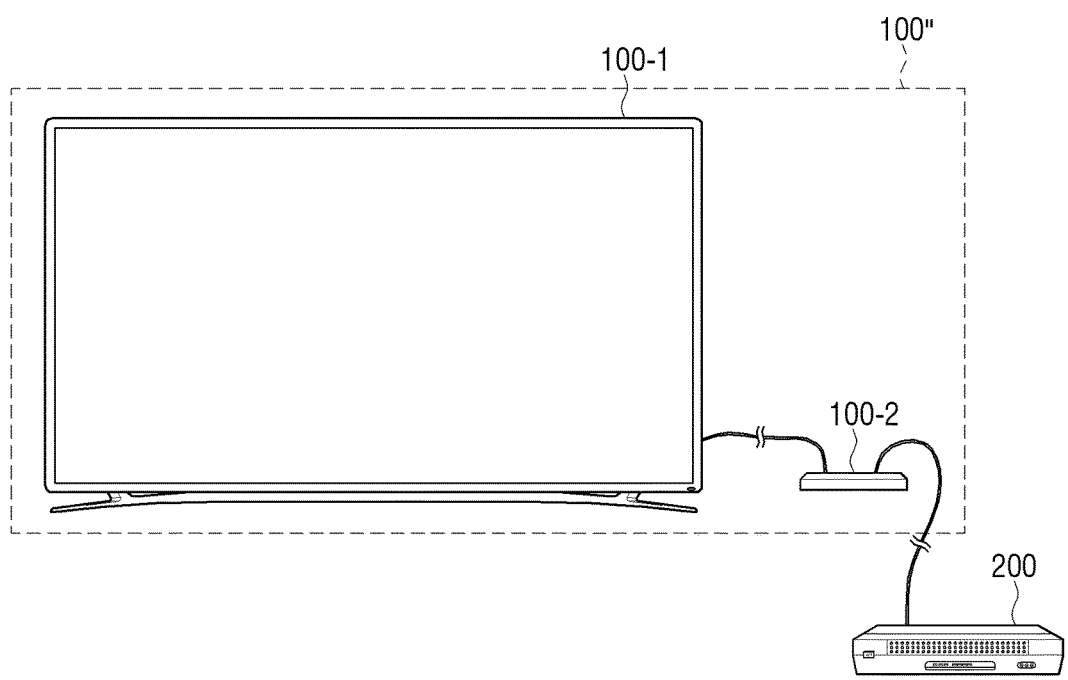
FIG. 16 is a view to illustrate a display device according to another exemplary embodiment.

FIG. 16 is a view to illustrate the display device according to another exemplary embodiment.

Referring to FIG. 16, the display device 100" includes an electronic device 100-1 and a control box 100-2 which presents separately from the electronic device 100-1 and is linked to the electronic device 100-1 by a fiber-optic cable.

The electronic device 100-1 may display various screens, and may be implemented as, for example, a TV, a projector, a monitor and the like.

The control box 100-2 controls the electronic device 100-1 to display various screens, and may perform an overall operation of the display devices 100 and 100' described above with reference to FIGS. 1 to 15. For example, the control box 100-2 analyzes an image corresponding to the image signal received from the image providing apparatus 200 and identifies whether the channel of the image is changeable, and if the channel of the image is changeable, controls the electronic device 100-1 to display the UI for changing a channel according to the control signal received from the remote controlling apparatus 300. In addition, the control box 100-2 may control the image providing apparatus 200 to change a channel to the channel selected through the UI for controlling a channel which is displayed on the electronic device 100-1.

The control box 100-2 includes a processor for performing the operations according to the above described various embodiments, and also includes a communicator for communicating with an external device such as the electronic device 100-1, the image providing apparatus 200, the remote controller 300 and the like. The processor of the control box 100-2 may correspond to the processor 130 described above in FIG. 6 or FIG. 15, and the controller of the control box 100-2 may correspond to the communicator 120 described in FIG. 6 or to the communicator 170 and input/output unit 180 described in FIG. 15. The electronic device 100-1 may correspond to the display 110 described in FIG. 6 or FIG. 15.

Figure 17:
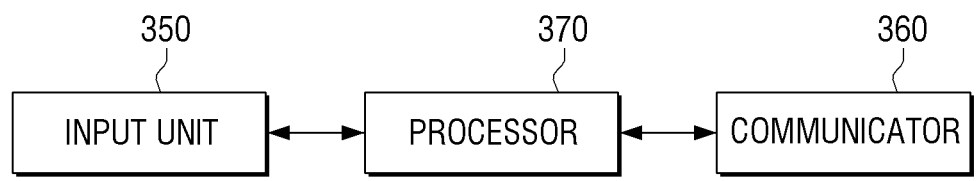
FIG. 17 is a block diagram to illustrate a remote controller according to an exemplary embodiment.

As described in the above, since the control box 100-2 presents separately, without needing to link all surrounding apparatuses to the electronic device 100-2 complicatedly, the electronic device may be linked to the surrounding apparatuses by linking the control box 100-2 to the surrounding apparatuses and linking the control box 100-2 to the electronic device 100-1 using one line easily. Accordingly, user convenience may be enhanced. FIG. 17 is a block diagram to illustrate the remote controller 300 according to an exemplary embodiment.

Referring to FIG. 17, the remote controller 300 includes an input unit 350, a communicator 360 and a processor 370.

The input unit 350 receives a user input. The input unit 350 may include, for example, a physical button, a touch pad, a motion sensor and the like.

The communicator 360 performs communications with various external apparatuses, and may access the external apparatuses though a wireless communication (e.g., Z-wave, 4LoWPAN, Radio-Frequency Identification (RFID), LTE Device to Device (D2D), Bluetooth low energy (BLE), General Packet Radio Service (GPRS), Weightless, Edge Zigbee, ANT+, NFC, Infrared Data Association (IrDA), DECT, wireless LAN (WLAN), Bluetooth, Wi-Fi, Wi-Fi Direct, Global System for Mobile Communications (GSM), Universal Mobile Telecommunications System (UMTS), LTE, WiBro and the like) in addition to LAN and internet network. The communicator 360 may include various communication chips such as a Bluetooth chip, a wireless communication chip and the like. The communicator 360 may include at least one of a light output unit which may output an infrared control signal and a light receiver which may receive the infrared control signal.

The processor 370 controls an overall operation of the remote controller 300. The processor 370 may include a CPU, a RAM, a ROM, and a system bus.

When a user input is received through the input unit 350, a control signal corresponding to the user input may be output through the communicator 360. The processor 370 may generate the control signal in various ways based on the control code set stored in a storage (not illustrated).

For example, the processor 370 may generate a control signal for changing a channel if a channel button is selected and generate a control signal for a channel scroll if it is sensed that the channel button is long pressed, as illustrated in FIG. 8.

For another example, as illustrated in FIGS. 9A to 9B, the processor 370 may generate a control signal for a channel scroll if a channel button is selected and the selection is maintained for a predetermined time or more, and generate a control signal for changing a channel if a channel button is released before the predetermined time passes.

For another example, as illustrated in FIG. 9C, if a channel button is selected and the selection is maintained for a predetermined time or more, the processor 370 may generate control signals for changing a channel successively from a time when the channel button is selected.

The processor 370 may generate a control signal according to the control command received from an external apparatus. For example, if a control command to generate a control signal to control the image providing apparatus 200 is received from the display devices 100 and 100', the processor 370 may generate the control signal on the basis of a control code set of the image providing apparatus 200 and output the control signal through the communicator 360.

Various exemplary embodiments described above may be implemented in a recording medium that may be read by a computer or a similar apparatus to the computer by using software, hardware, or a combination thereof. According to the hardware embodiment, exemplary embodiments that are described in the present disclosure may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for performing other functions. In some cases, exemplary embodiments that are described in the present disclosure may be embodied as the processor 130 itself. In a software embodiment, various embodiments described in the present disclosure such as a procedure and a function may be implemented as separate software modules. The software modules may respectively perform one or more functions and operations described in the exemplary embodiments.

According to various exemplary embodiments, computer instructions for performing a process operation in the display device 100 and 100' or in the control box 100-2 may be stored in a non-transitory computer-readable medium. If the computer instructions stored in the non-transitory computer-readable medium is executed by a processor of a specific apparatus, the computer instructions cause the specific apparatus to perform the process operation in the display device 100 and 100' or in the control box 100-2.

Meanwhile, the computer instructions for performing a process operation in the remote controller 300 described above may be stored in a non-transitory computer readable medium. If the computer instructions stored in the non-transitory computer-readable medium is executed by the processor of a specific apparatus, the computer instructions cause the specific apparatus to perform the process operation in the remote controller 300. For a specific example, an application program for performing the process operation of the remote controller 300 may be mounted on a smartphone, and the smartphone may operate as the remote controller 300.

The non-transitory computer readable medium is not limited to a medium that permanently stores data therein, e.g., a register, a cache, a memory, or the like, but can be a medium that semi-permanently stores data therein and is readable by a device. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display device comprising:
a display;
a first communicator configured to communicate with an external device;
a second communicator configured to communicate with a remote controller; and
a processor configured to:
control the display to display an image corresponding to an image signal received from the external device through the first communicator, and
in response to a control signal being received from the remote controller through the second communicator while the image is displayed on the display, control the display to display the image with a user interface (UI) for changing a channel based on the image not including a specific object and control the display to display the image without the UI for changing a channel based on the image including the specific object.

2. The display device as claimed in claim 1, wherein the processor, in response to a UI which informs a channel change being displayed on the display, activates a display function of the UI for changing a channel, and in response to the control signal being received while the display function of the UI for changing a channel is activated, controls the display to display the UI for changing a channel.

3. The display device as claimed in claim 2, wherein the processor, in response to the UI for changing a channel being displayed and the control signal not being received for a preset time, deactivates the display function of the UI for changing a channel.

4. The display device as claimed in claim 2, wherein the processor, in response to the control signal not being received while the UI which informs the channel change is displayed on the display and the UI which informs the channel change disappearing, deactivates the display function of the UI for changing a channel.

5. The display device as claimed in claim 2, wherein the UI for changing a channel includes an indicator which searches a channel while moving toward a direction corresponding to the control signal, and wherein the processor recognizes a channel number included in a UI element which is displayed when the channel is changed, and moves the indicator from a point corresponding to the recognized channel number.

6. The display device as claimed in claim 5, wherein the processor controls the display to display the recognized channel number in the indicator.

7. The display device as claimed in claim 1, wherein the UI for changing a channel includes an indicator which searches a channel while moving toward a direction corresponding to the control signal, and wherein the processor, in response to the indicator moving and stopping, performs an operation to control the external device to change a channel to a channel corresponding to a position in which the indicator stops.

8. The display device as claimed in claim 7, wherein the processor transmits a control signal which corresponds to the channel corresponding to the position in which the indicator stops to the external device through the first communicator.

9. The display device as claimed in claim 7, wherein the processor transmits a control command which corresponds to the channel corresponding to the position in which the indicator stops to the remote controller through the second communicator, and wherein the control command is a control command which causes the remote controller to transmit the control signal for controlling the external device to change a channel to the channel corresponding to the position in which the indicator stops.

10. The display device as claimed in claim 1, wherein the specific object includes at least one of a menu UI which includes a plurality of selectable UI elements and an electronic program guide (EPG).

11. A display system comprising:

an image providing apparatus configured to provide an image signal;
a display device configured to display an image corresponding to an image signal provided from the image providing apparatus; and
a remote controller,
wherein the display device is configured to:
in response to a control signal being received from the remote controller while the image is displayed on the display device, display the image with a UI for changing a channel based on the image not including a specific object and display the image without the UI for changing a channel based on the image including the specific object identified through image analysis on the image.

12. The display system as claimed in claim 11, wherein the remote controller, in response to a preset time being passed in a state in which a specific button of the remote controller is selected, transmits the control signal.

13. The display system as claimed in claim 11, wherein the display device displays an indicator which searches a channel while moving toward a direction corresponding to the control signal on the UI for changing a channel, and transmits a control signal which corresponds to a channel corresponding to a position in which the indicator stops to the image providing apparatus.

14. The display system as claimed in claim 11, wherein the display device displays an indicator which searches a channel while moving toward a direction corresponding to the control signal on the UI for changing a channel, and transmits a control command which corresponds to a channel corresponding to a position in which the indicator stops to the remote controller, and wherein the remote controller receives the control command from the display device, transmits a control signal which corresponds to the channel corresponding to the position in which the indicator stops to the image providing apparatus.

15. A method for controlling a display device comprising:

displaying an image corresponding to an image signal provided from an external device; and
in response to a control signal being received from a remote controller while the image is displayed on the display device, displaying the image with a UI for changing a channel based on the image not including a specific object and displaying the image without the UI for changing a channel based on the image including the specific object.

16. The controlling method as claimed in claim 15, wherein the displaying the UI for changing a channel comprising:

in response to a UI informing a channel change being displayed on the display device, activating a display function of the UI for changing a channel; and
in response to the control signal being received while the display function of the UI for changing a channel is activated, controlling to display the UI for changing a channel.

17. The controlling method as claimed in claim 16, further comprising:

in response to the UI for changing a channel being displayed and the control signal not being received during a preset time, deactivating the display function of the UI for changing a channel.

18. The controlling method as claimed in claim 16, further comprising:

in response to the control signal not being received while the UI informing the channel change is displayed on the display device and the UI informing the channel change disappearing, deactivating the display function of the UI for changing a channel.

19. The controlling method as claimed in claim 16, wherein the UI for changing a channel includes an indicator which searches a channel while moving toward a direction corresponding to the control signal, and wherein the displaying the UI for changing a channel recognizes a channel number included in a UI element which is displayed when the channel is changed, and moves the indicator from a position corresponding to the recognized channel number.

20. The controlling method as claimed in claim 19, wherein the displaying the UI for changing a channel displays the recognized channel number in the indicator.

* * * * *